(12) United States Patent
Peterson et al.

(10) Patent No.: US 8,539,566 B2
(45) Date of Patent: Sep. 17, 2013

(54) RESOURCE MONITORING USING A JMX MESSAGE BRIDGE

(75) Inventors: James Arnold Peterson, Billerica, MA (US); Ilya Kagansky, Lincoln, MA (US); Christopher Allen Bergin, Gloucester, MA (US)

(73) Assignee: Sybase, Inc., Dublin, CA (US)

( * ) Notice: Subject to any disclaimer, the term of this patent is extended or adjusted under 35 U.S.C. 154(b) by 495 days.

(21) Appl. No.: 12/760,123

(22) Filed: Apr. 14, 2010

(65) Prior Publication Data

US 2011/0258688 A1    Oct. 20, 2011

(51) Int. Cl.
G06F 7/04      (2006.01)
G06F 15/16     (2006.01)
G06F 17/30     (2006.01)
H04L 29/06     (2006.01)

(52) U.S. Cl.
USPC .......................................................... 726/7

(58) Field of Classification Search
USPC .......................................................... 726/7
See application file for complete search history.

(56) References Cited

U.S. PATENT DOCUMENTS

2008/0034367 A1* 2/2008  Patrick et al. ................. 718/101
2008/0083026 A1* 4/2008  Sent ............................... 726/10
2009/0182880 A1* 7/2009  Inamdar et al. ............... 709/226

OTHER PUBLICATIONS

BEAOracle JRockit Mission Control™® Monitoring MBeans from the JRockit Management Console JRockit Mission Control 3.0.2 Document Revised: Jun. 2008.*
Determining if any active HTTP Sessions exist for deployed applications in OAS 10.1.3.x http://theblasfrompas.blogspot.com/2008/08/determining-if-any-active-sessions.html Posted by Pas Apicella at Aug. 11, 2008 10:04:00 AM.*

* cited by examiner

*Primary Examiner* — Kambiz Zand
*Assistant Examiner* — Benjamin Kaplan
(74) *Attorney, Agent, or Firm* — Sterne, Kessler, Goldstein & Fox PLLC

(57) ABSTRACT

A system, method, and computer program product for monitoring managed resources by subscribing to broadcast notifications relayed by a Java Management Extensions (JMX) message bridge between JMX managed beans (JMX MBeans) and a client application with user interface (UI) components. In an embodiment, ADOBE™ FLEX™ user UI components subscribe to JMX broadcast notifications. The method generates messages destined for UI components using a JMX broadcaster. JMX MBeans are created in a JMX server and are subscribed to JMX broadcasts. The JMX MBeans are created with filter values identifying destination UI components. A JMX managed object name is passed to the UI during the creation of the UI components. The UI components become consumers of a message topic. A JMX message adapter dedicated to the communication with the JMX MBeans receives JMX broadcast notifications. Messages generated by the JMX broadcaster are relayed to the destination UI components through the JMX MBeans.

24 Claims, 14 Drawing Sheets

RESOURCE MONITORING USING A JMX MESSAGE BRIDGE

APPENDIX DATA

Computer Program Listing Appendix under Sec. 1.52(e): This patent application includes a transmittal under 37 C.F.R. Sec. 1.52(e) of a Computer Program Listing Appendix. The Appendix, which comprises a Word file that is IBM-PC machine and Microsoft Windows Operating System compatible, includes the below-listed file. All of the material disclosed in the Computer Program Listing Appendix can be found at the U.S. Patent and Trademark Office archives and is hereby incorporated by reference into the present application.

Object Description: APPENDIX I.doc, created Jul. 29, 2013, 10:09 AM, size: 21 KB.

BACKGROUND OF THE INVENTION

1. Field of the Invention

The present invention is generally directed to monitoring managed resources and more particularly directed to a system and methodology for relaying broadcast notifications between the management server and a resource management client using a Java Management Extensions (JMX) message bridge.

2. Background Art

Conventional resource monitoring and management tools use notifications to indicate when resource errors occur, but lack an architecture that allows user interface (UI) elements to subscribe to broadcast notifications that users are interested in. SYBASE™ Control Center (SCC) is an example of a currently available resource monitoring and management solution with a notification component. SCC consists of a server with a web browser based monitoring and administration tool and a user interface (UI). SCC is a web-based management tool, which provides an integrated set of management, monitoring, and configuration capabilities across multiple products. SCC can be used to monitor SYBASE™ products through a standard Internet web browser with the ADOBE™ Flash player plug-in.

The ADOBE™ Flash player, the ADOBE™ FLEX™ software development kit, and and BlazeDS server-based Java web messaging components provide significant advances in client server technology. However, using these components with a JMX server requires an ability to relate JMX managed beans (JMX MBeans) with their counterparts as presented within a client application running in a web browser.

Data processing systems typically employ multiple, geographically distributed resources that must be monitored and managed remotely. These managed resources can include servers running multiple, disparate platforms and operating systems (OSs) which in turn host multiple processes and enterprise applications. System administrators, database administrators (DBAs), and other users need to be alerted or notified of events occurring on managed resources without having to poll or manually check each resource being monitored. System administrators and other users also need to be notified of events occurring on managed resources when they are away from the office and not co-located with the managed resources. For example, users need to be able to monitor managed resources off-hours from mobile computing devices, home computers, pagers and other remote computing devices.

Accordingly, what is desired is a means of monitoring managed resources by broadcasting notifications triggered by events occurring on managed resources to users who do not have direct access to the managed resources. What is further desired are methods, systems, and computer program products for enabling a user, using a client application such as, but not limited to, Flash in a web browser and Flash ADOBE™ Integrated Runtime (AIR™), to subscribe to and receive notifications related to message topics associated with managed resources they wish to monitor. What is further needed is a means for relaying messages related to notifications to a client application configured to run Flash or Flash Lite.

Data push techniques are often employed for communications within enterprise style Rich Internet Applications (RIAs). In Internet-based communication using data push techniques, a request for a given transaction is initiated by a publisher or central server. As data push techniques route data from servers to clients, this communication technique can be inefficient in cases where a client does not require data being pushed from the central server. With data push techniques, servers send updates as they occur and not when they are requested or required by clients. However, using a push technology to communicate the status of managed resources to resource management clients can unnecessarily burden the managed resources and increase their load by requiring them to continually push communications to resource management clients. Conversely, if a pull communication technique is used by resource management clients to pull the current status from managed resources, the clients may not be aware of status changes for managed resources unless the clients periodically initiate communications.

Accordingly, what is further needed are methods, systems, and computer program products for resource monitoring which provide a message bridge between notifications triggered by events on managed resources, wherein the notifications are pushed from an intermediate messaging server such as, but not limited to, a BlazeDS message service, and wherein the message bridge also employs push technology that engages resource management clients to selectively receive data updates in the form of broadcast notifications, and then pushes updated data to a resource management client based on subscriptions established by the client. In this way, the message bridge reduces the load on managed resources while simultaneously providing resource management clients with updated status of managed resources being monitored at the client.

BRIEF SUMMARY OF THE INVENTION

The invention includes systems, methods, and computer program product embodiments for monitoring managed resources by relating broadcast notifications from a JMX server to message topics of managed objects representing managed resources. Briefly stated, embodiments of the invention establish a JMX message bridge to enable communication of broadcast notifications between a management server and resource management client applications. According to embodiments of the invention, methods, systems, and computer program products form a message bridge between a central JMX broadcaster and a destination user interface (UI) component within an ADOBE™ Flash player running in a web browser, ADOBE™ Flash AIR™ running on a desktop or ADOBE™ Flash Lite running on a mobile device.

In an embodiment, JMX Managed beans (JMX MBeans) are used to represent managed objects in a system and a user (running a client application) in the system. In an embodiment, an alert system is built into a central management application, such as, but not limited to, the SYBASE™ Control Center (SCC). The managed objects are logical representations of managed resources. According to an embodiment of the present invention, real-time alerts can be sent to client applications running on computing devices such as, but not limited to computer workstations and mobile devices to provide real-time alert notification regarding managed resources any time, anywhere. Alert thresholds can be customized to meet specific user and organization requirements.

An embodiment of the invention relates broadcast notifications of a JMX server with one or more message topics and sub-topics of an ADOBE™ FLEX™ application. In an embodiment, standard JMX notifications in concert with specialized JMX MBeans, a customized JMX message adapter, and a BlazeDS service relay notifications between managed resources and a client application used to monitor the managed resources. In an embodiment, the client application includes user interface (UI) components that run within an ADOBE™ flash player. The UI components allow users using the client application to subscribe to broadcasts that are of interest. For example, users can subscribe to broadcast notifications corresponding to managed resources they wish to monitor.

Embodiments of the present invention include methods, systems, and computer program products for relating broadcast notifications of a JMX server with message topics of an ADOBE™ FLEX™ application.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

FIG. 5 illustrates an exemplary display of starting a control center server, in accordance with an embodiment of the invention.

FIG. 10 illustrates an exemplary display of instantiating an Mbean with user scope in a Control Center server, in accordance with an embodiment of the invention.

Figure 1:
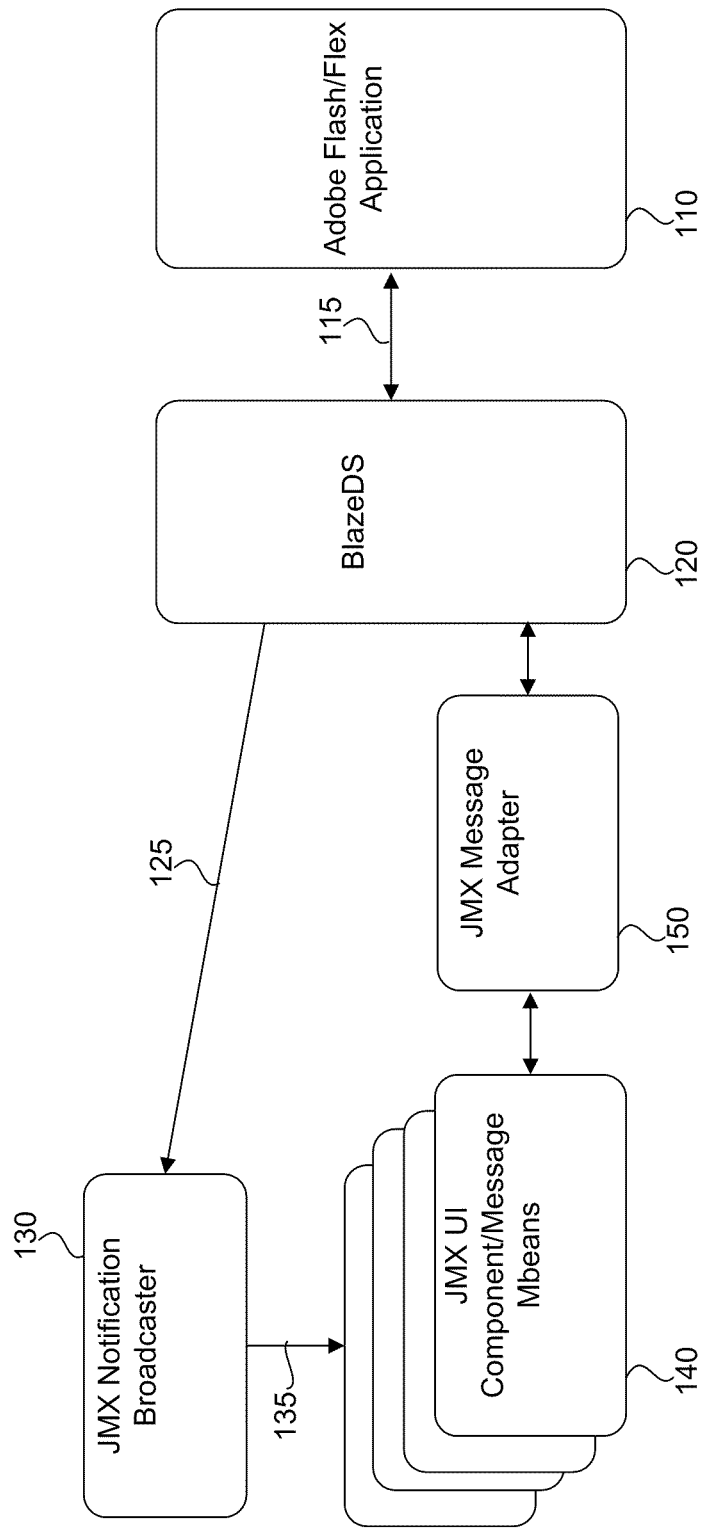
FIG. 1 depicts a modular view of a system for broadcasting JMX notifications to subscribers, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

The present invention relates to system, method, computer program product embodiments, and combinations and sub-combinations thereof for establishing a message bridge between user interface (UI) elements of a client application and server broadcast notifications. In an embodiment, a central JMX broadcaster is employed to generate messages related to notifications destined for the UI. JMX 'broadcaster' MBeans are created in the JMX server for broadcasting notifications from managed resources to a BlazeDS message service. The BlazeDS message service is customized to relay messages to UI components (elements) of a client application to enable a user interacting with the UI to monitor managed resources in a system.

An embodiment of the invention includes a centralized management server and zero or more distributed management agents. In an embodiment, the agent is a Java process running on a host server where a managed resource may or may not reside (e.g. Agent vs. Agentless deployment). In accordance with an embodiment of the invention, the management agent and management server provides: a container for agent plug-ins to run; services for runtime support of agent plug-ins; and communication protocols for interaction with the agent services and plug-ins.

Glossary

The following definitions are offered for purposes of illustration, not limitation, in order to assist with understanding the discussion that follows.

As used herein, in an embodiment, the term "managed resource" encompasses back end servers, processes, and hardware resources such as routers and printers. A managed resource is any hardware or software object that a user wishes to monitor. In an embodiment, such monitoring is achieved by subscribing to broadcast notifications sent a message bridge through a JMX message adapter, which is described in more detail below. In accordance with a Control Center embodiment, a resource is a unique product component or subcomponent, with a server being the most common managed resource. Managed resources comprise many components, including servers, databases, devices, and processes. According to an embodiment of the invention, a managed resource is a product component or subcomponent that the Control Center application allows a user to monitor and manage. A description of the Control Center application is provided below.

As used herein, in an embodiment, a Control Center is a server application that uses a ADOBE™ Flash Player based resource management client application to deliver an integrated solution for monitoring and managing resources. An exemplary embodiment of a Control Center is the SYBASE™ Control Center. The Control Center provides a single comprehensive web administration console for real-time performance, status, and availability monitoring of managed resources such as back end enterprise servers. In an embodiment, the Control Center combines the JMX architecture 200 illustrated in FIGS. 2A and 2B, a rich client administrative console/graphical user interface (GUI) depicted in FIGS. 6-9 and 11-12, agents 245 depicted in FIG. 3, common services of architecture 200 illustrated in FIGS. 2A and 2B, and tools for managing and monitoring managed resources. In accordance with embodiments of the invention, the Control Center application includes historical monitoring, threshold-based alerts and notifications, alert-based script execution, and intelligent tools for identifying events, performance status, and usage trends for managed resources. According to an embodiment of the invention, alerts and notifications related to managed resources are delivered via MBean broadcast notifications via a JMX message adapter to a resource management client ADOBE™ FLEX™ management client. In this exemplary embodiment, the client application runs within an ADOBE™ flash player and flash player Lite.

As used herein, in an embodiment, a managed object is a logical representation of a managed resource. In accordance with an embodiment of the invention, each managed resource is represented as a managed object, which in turn has a managed object name and a JMX notification broadcaster MBean associated with it. According to the Control Center embodiment, a resource explorer UI lists managed objects for each managed resource that a user has registered with the Control Center application. In an embodiment of the invention, registering a server, application, or agent also makes the Control Center application aware of any subcomponents. A user, using a resource management client application, can register resources as individual managed objects or in batch mode to import multiple managed resources as managed objects. Once server and agent resources are registered, their availability and performance can be monitored by monitoring their corresponding managed objects in a client application UI.

As used herein, in an embodiment, the term "server" encompasses computing devices that are designed to function as one or more of JMX servers, MBean servers, BlazeDS message services, resource management clients, and managed resources such as, but not limited to, enterprise applications, processes, network links, web servers, replication servers, database servers, firewall servers, and other back end enterprise servers such as email servers, file servers, and application servers. A server may be comprised of one or more server machines. A server may be implemented as collection of servers such as a server farm or server cluster. For example, a database server may be a commercially available server machine with one or more central processing units (CPUs). Alternatively, a database server may comprise multiple computing devices and/or computing functionality hosted on multiple server machines (i.e., a server farm).

As used herein, in an embodiment, an event is a condition on a managed resource that triggers a notification. For example, a shutdown, restart, or reboot of a managed resource are events that can trigger notifications. Events may also trigger notifications when operational values associated with performance of a managed resource exceed one or more predefined, tunable thresholds. For example, an event may be defined for when CPU utilization on a managed resource exceeds a certain percentage threshold. Events can also be defined when storage utilization or disk access latency exceed predefined thresholds. Events can also be defined in relation to processes, applications, and application performance. For example, the shutdown of a relational database, presence of database corruption (i.e., a database being marked as 'suspect'), replication failures, available database storage exceeding a percentage threshold, and database query times exceeding a threshold, are other events that can trigger notifications. When a server or application has an unknown or undetermined state, these events can also trigger notifications (i.e., to indicate that a server or process is non-responsive or a requests to the server/process have timed out). State changes, including, but not limited to, the entry of a server or application into single user mode are also events that can trigger notifications.

As used herein, in an embodiment, a notification is an indication of the occurrence of an event. Notifications are triggered by events and are broadcast to a plurality of subscribers who have expressed interest in receiving notifications associated with certain events occurring within managed resources. The purpose of a notification is to trigger a broadcast to one or more subscribers. An event-triggered notification may in turn trigger another event, which causes a message to be sent to a recipient. According to an embodiment of the invention, notifications are broadcasted by the JMX notification broadcaster 130 depicted in FIG. 1. The functionality of the JMX notification broadcaster 130 is described in greater detail below with reference to the resource monitoring system 100 embodiment depicted in FIG. 1.

As used herein, in an embodiment, a message comprises information to be communicated to a specific user or destination. Messages may be created as a result of an event-triggered notification. Messages may be emails, alerts, short message service (SMS) messages or other communications to be delivered to a targeted destination. An event-triggered broadcast notification can result in a subsequent creation of a message sent to a subscriber of a message topic related to the notification.

As used herein, in an embodiment, a JMX MBean is a unit of work that can be representative of an object within a system. JMX MBeans are Java classes that meet naming and inheritance standards dictated by the JMX standards. Objects within a system can be a resource, a particular operation within a large process. JMX MBeans can be used to manage resources and processes. In accordance with the exemplary embodiments depicted in FIGS. 1, 2A, and 2B, specialized JMX MBeans 140 receive JMX broadcast notifications from JMX notification broadcaster 130 so that messages generated by JMX notification broadcaster 130 are relayed by the JMX MBeans 140 to UI components (elements) within the client application. In accordance with embodiments of the invention, JMX MBeans 140 can be created on a per user, per browser session, a per server, and per application basis. JMX MBeans 140 can also be created based on a type of user interface (UI) component. JMX MBeans 140 are described in greater detail below with reference to FIGS. 1, 2A, and 2B.

As used herein, in an embodiment, a JMX server is a server dedicated to the management of system resources. JMX MBeans 140 within a JMX server are used to manage backend components of a system. Backend components can be, but are not limited to enterprise applications, processes, network links, database servers, routers, application servers, replication servers, and other enterprise servers. In accordance with an embodiment of the invention, an MBean is created to represent a managed object for a user as in the client application. JMX MBeans 140 are also created for each representation of the backend components of a system being managed. In an embodiment, the backend components comprising a system being managed may be logically grouped into a list of 'perspective resources.' According to the exemplary embodiments depicted in FIGS. 2A, 2B, and 3, JMX server 202 hosts an agent comprising agent layer 245 having common services which communicate with a client application via calls 125 to protocol connector 215. The functionality of the JMX server 202 is described below with reference to FIGS. 2A, 2B, and 3.

As used herein, in an embodiment, a BlazeDS server is a server-based Java remoting and web messaging technology that enables developers to connect to back-end distributed data and push data in real-time to ADOBE™ FLEX™ and ADOBE™ AIR™ applications for more responsive RIA experiences. Java remoting and web messaging server that allows a client monitoring application to receive distributed data from back end managed resources. For example, a BlazeDS server can push data in real-time to ADOBE™ FLEX™ client applications running within an ADOBE™ flash or flahs Lite player in a web browser client. As would be appreciated by one of skill in the relevant arts, a BlazeDS server can be implemented as hardware, software, or a combination of hardware and software and is not precluded from being used with other client platforms, such as, but not limited to, JavaScript/Ajax.

Unless specifically stated differently, in an embodiment, a user is interchangeably used herein to identify a human user, a software agent, or a group of users and/or software agents. Besides a human user who needs to monitor managed resources, a software application or agent sometimes needs to monitor managed resources. Accordingly, unless specifically stated, the term "user" as used herein does not necessarily pertain to a human being. A user may be represented by an MBean. A user may also be represented by a client application. Users can have login credentials associated with them. Login credentials can include, but are not limited to, a user name and a password.

According to embodiments of the invention, broadcast notifications between managed resources and client applications used to monitor the managed resources are relayed by a JMX bridge.

The next section describes a system for monitoring managed resources such as enterprise applications, processes, network links, database servers, application servers, web servers, and firewall servers. Subsequent sections describe architectures and methods for monitoring managed resources. The systems, architectures, and methods include subscriptions to event-triggered broadcast notifications at a resource management client having UI components associated with the managed resources.

Resource Monitoring System

FIG. 1 depicts a modular view of a resource monitoring system 100. Resource monitoring system 100 allows a client application 110 to connect to receive messages 115 from a BlazeDS server 120 via JMX message adapter 150, in accordance with an embodiment of the present invention.

In the exemplary embodiment depicted in FIG. 1, client application 110 is an ADOBE™ Flash application written using the ADOBE™ FLEX™ software development kit. While this embodiment is described chiefly in terms of a connection between an ADOBE™ Flash client application 110 and central JMX notification broadcaster 130, it is applicable to other client applications with user interface (UI) components.

Client application 110 can be used to create or update UI components that need JMX notifications. The 'need' for notifications is based upon subscriptions to one or more JMX message JMX MBeans 140. In an embodiment, client application 110 is a resource management client used to monitor a plurality of managed resources.

After UI components are created or updated, client application 110 makes a standard remote call through BlazeDS message service 120 to ask JMX notification broadcaster 130 to request a message JMX MBean 140 corresponding to the JMX UI component.

In embodiments of the invention, use of server-based web messaging technology resident on BlazeDS message services 120 provide at least two data push techniques for sending messages 115 from JMX message JMX MBeans 140 to the ADOBE™ FLEX™ client application 110 asynchronously. One technique is messaging services, which send messages to and receive messages from server side destinations. Another technique is a Java Message Service (JMS) Adapter, which integrates ADOBE™ FLEX™ messaging with JMS destinations. These two techniques are described below with reference to the components of resource monitoring system 100.

According to an embodiment of the invention, the BlazeDS message service 120 employs a server push technique and uses a specialized adapter to the messaging services. An exemplary Extensible Markup Language (XML) implementation of this embodiment is discussed below. The following code is an embodiment for an exemplary XML implementation. In this embodiment, XML scripting language is used to implement a specialized message adapter for the messaging services. As would be appreciated by one of skill in the relevant arts, other programming languages and technologies can be used to implement specialized message adapter in the programming language code samples below.

In a messaging configuration XML file messaging (e.g., config.xml), a message adapter is defined as follows:
    <adapter-definition id="jmx" class="JMXAdapter"/>.

The message ActionScript adapter is enabled and a destination is created as follows:
    <destination id="notificationTopic"/>

In the ADOBE™ FLEX™ client application 110, for example, a consumer with a subscription is defined for the above destination, thus enabling the consumer in client application 110 to receive messages 115 from BlazeDS message service 120.

```
<mx:Consumer id="consumer" destination="notificationTopic"
message="messageHandler(event);" fault="faultHandler(event);"
/>
...
consumer.subscribe( );
```

On the Java side, the context of JMX UI components corresponding the web client application 110 can be code within message JMX MBeans 140 that performs the following steps:

```
AsyncMessage message = new AsyncMessage( );
...
// configure message properties
// set destination as "notificationTopic"
// set message body
...
// send message to destination
MessageBroker.getMessageBroker(null).routeMessageToService(
message, null);
```

According to the above-described embodiment of the invention, the specialized JMX message adapter 150 performs the key functionality of addressing the issue of listening for JMX MBean notifications 135 originating from JMX notification broadcaster 130, translating the notifications 135 into messages 115, and relaying messages 115 to the ADOBE™ FLEX™ client application 110 via BlazeDS message service 120.

Message JMX MBeans 140 register themselves with JMX notification broadcaster 130 by passing a subject name and filters corresponding to a subscription. The message JMX MBeans 140 then wait for notifications from JMX notification broadcaster 130 and subscriptions from JMX message adapter 150.

In another, alternative embodiment of the present invention, a JMS adapter (not shown) is used instead of the messaging services embodiment described above. In accordance with this embodiment, the JMS adapter may be defined as follows:    <adapter -definition id="jms" class="JMSAdapter"/>.

According to this embodiment, the JMS adapter integrates ADOBE™ FLEX™ messaging with JMS destinations so that either client application 110 or the JMX server can post to (produce) and/or listen to (consume) a JMS message topic or queue. This approach also can be used in combination with message JMX MBeans 140 when a message JMX MBean 140 can post a notification 135 to a message 'bus.' When a message JMX MBean 140 posts a notification 135, the JMS adapter listens at an endpoint of the message bus and transmits a corresponding message 115 to client application 110. This embodiment is flexible enough to be used as a basis for building loosely coupled enterprise applications. Although the JMS adapter can be used in resource monitoring system 100 for monitoring availability of managed resources, the JMS adapter can result in change latency for UI components of client application 110.

Figure 2A:
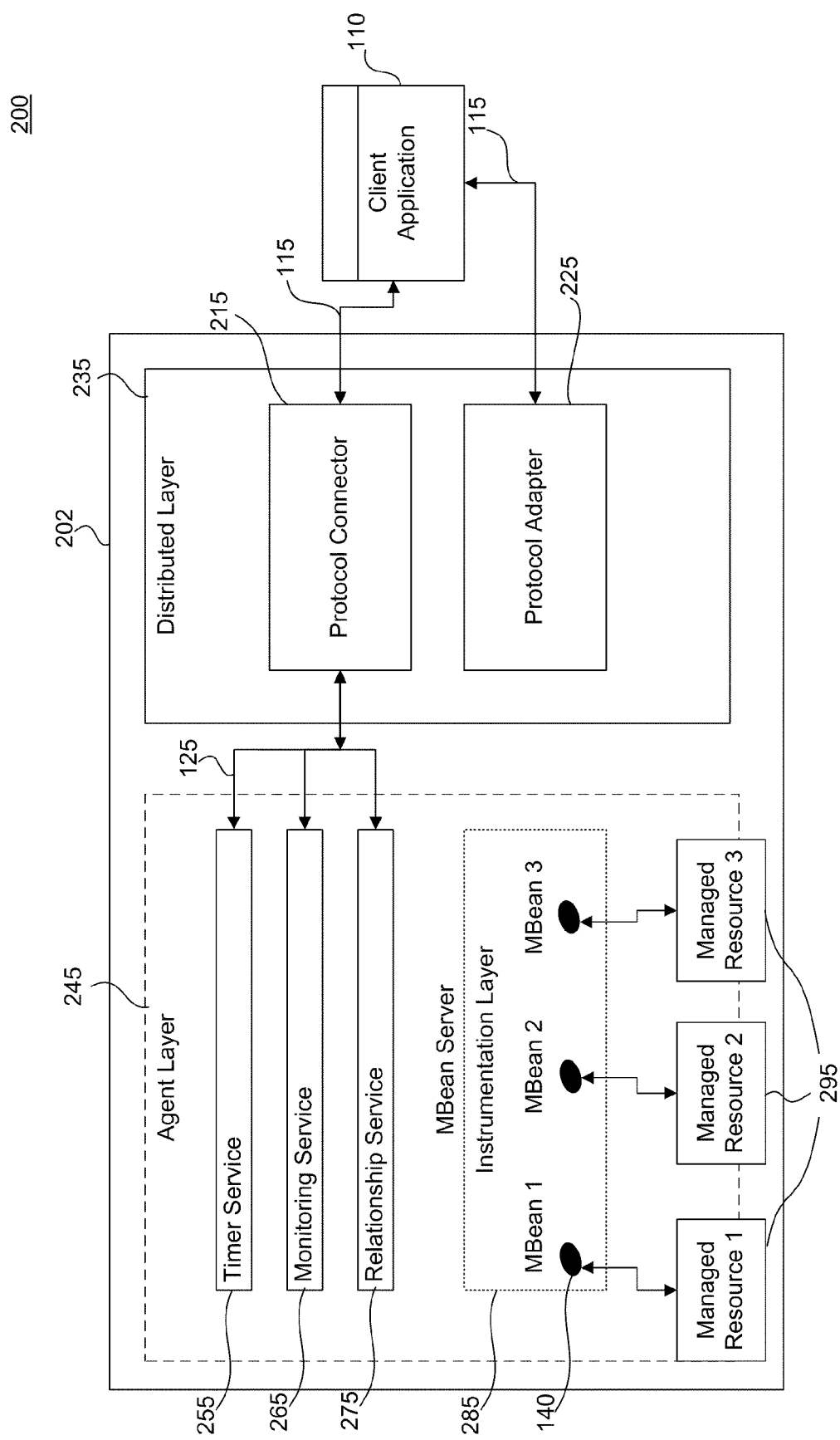
FIG. 2A illustrates a JMX system architecture, in accordance with an embodiment of the present invention.
Figure 2B:
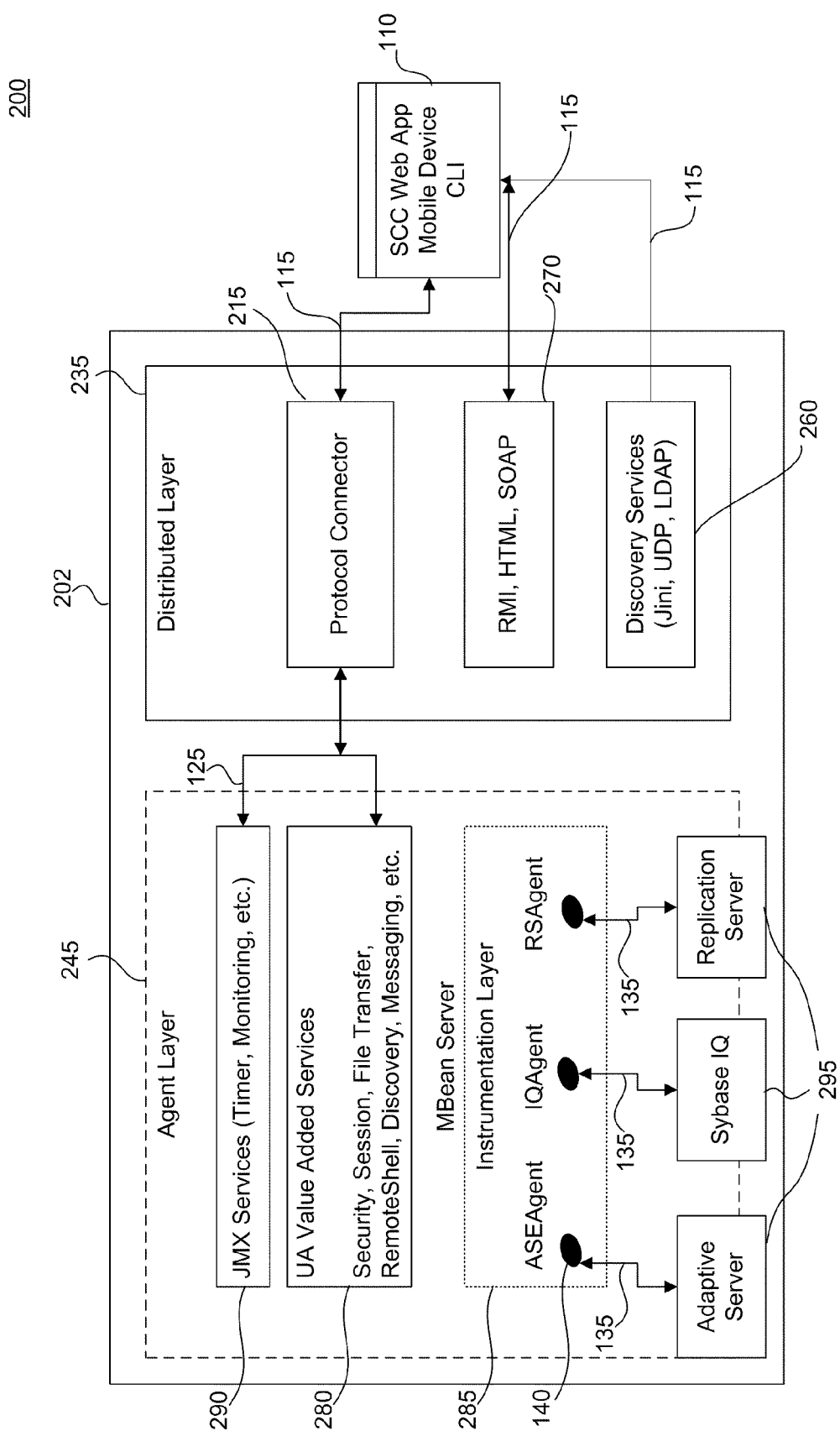
FIG. 2B illustrates SYBASE™ Control Center management server based upon a JMX system architecture, in accordance with an embodiment of the present invention.

In an embodiment, a return JMX notification broadcaster 130 to application JMX MBeans on BlazeDS messaging server 120 is created in a JMX server (element 202 in FIGS. 2A and 2B). According to an embodiment of the invention, application JMX MBeans 140 register themselves with JMX notification broadcaster 130 via calls 125. Calls 125 supply a filter that limits subsequent notification broadcasts 135 to BlazeDS messaging server relayed via JMX message adapter 150. A status is returned through BlazeDS message service 120 back to client application 110 as to the outcome of the creation of the subscription.

In accordance with an embodiment, when a user initiates the UI on client application 110, a call 125 is initiated from the BlazeDS message service 120 to JMX notification broadcaster 130. Call 125 indicates all of the components needed to support the UI. These needed components include the JMX UI components and message JMX MBeans 140 are created on an MBean server. The MBean server is described in further detail below with reference to the instrumentation layer 285 depicted in FIGS. 2A and 2B. Each of the JMX UI components and message JMX MBeans 140 register themselves to receive notifications 135 from JMX notification broadcaster 130.

The creation of a UI component within client application 110 triggers the client application 110 to initiate a subscription to a message JMX MBean 140 corresponding to the JMX UI. A subscription is created for the corresponding message topic defined on the BlazeDS message service 120, which results in the creation of a subscription to a notification 135 in message JMX MBeans 140 through the JMX message adapter 150.

According to an embodiment of the invention, messages 115 are pushed from BlazeDS message service 120 to client application 110. In this way, the UI of client application 110 does not need to poll, pull, or ask for status data from managed resources, thus reducing the load on the managed resources. As messages 115 are pushed from the BlazeDS message service 120, the UI of client application 110 does not change unless an event triggering a broadcast notification has occurred on a managed resource.

A message service resident on BlazeDS message service 120 provides a complete publish/subscribe infrastructure that allows the ADOBE™ FLEX™ client application 110 and the BlazeDS message service 120 to exchange messages 115 in real time. Remoting allows an ADOBE™ FLEX™ client application 110 to directly invoke methods of Java objects deployed in a JMX server.

In accordance with an embodiment of the invention, managed resources may be represented as icons within the UI of client application 110 wherein the appearance of the icon changes when the status of the corresponding managed resource has changed. For example, an icon representing a back end database server may be red when the server is down or in an unknown state, yellow when the server is starting or in single user mode, and green when the server is up and running. Similarly, an icon representing an enterprise application or process may be red when the application or process is down, unresponsive, or in an unknown state; yellow when the application or process is starting up; and green when the application or process is up and running. An exemplary embodiment of a UI of client application 110 representing managed resources as icons is provided in FIGS. 11 and 12, which are described below with reference to a description of a graphical user interface (GUI) embodiment of the invention.

According to an embodiment of the invention, a managed object is created or instantiated in the UI of client application 110 for each managed resource to be monitored within the UI. Each managed object has an object name, which is passed to the JMX message adapter 150 by Blaze DS message server 120.

In an embodiment, in order to receive messages pushed from the BlazeDS message service 120, client application 110 subscribes to one or more message topics on the BlazeDS message service 120. A subscription to a message topic is established by the client application 110 by passing a managed object name to BlazeDS message service 120, which then relays the object name to JMX message adapter 150.

JMX message adapter 150 ties subscriptions requested by client application 110 to corresponding message JMX MBeans 140. For each UI component on client application 110, there is a corresponding subscription to a JMX Mbean 140 representing a managed resource. A UI component JMX MBean 140 can also be created to track the UI subscriptions. In an embodiment, a UI component JMX MBean removes a UI subscription from the JMX server, such as JMX server 202 depicted in FIGS. 2A and 2B, after a predefined, tunable time period has passed or after a predefined, tunable delay has occurred.

When events occur on managed resources corresponding to a JMX MBean 140 subscribed to by client application 110, a notification is broadcast by JMX notification broadcaster 130.

A JMX notification 135 can be sent to any UI component in client application 110 by setting the appropriate filter and broadcasting the notification 135 to JMX notification broadcaster 130.

According to an embodiment of the invention, BlazeDS message service 120, JMX message adapter 150, message JMX MBeans 140, and JMX Notification broadcaster 130 all reside on a single JMX server. Alternatively, these components may be distributed across multiple servers.

In an embodiment of the invention, client application 110 can be implemented on a workstation computer. Alternatively, client application can be implemented on a mobile client with a web browser with support for the ADOBE™ flash player Lite. For example, client application 110 can be deployed to mobile clients, such as, but not limited to, a personal digital assistant (PDA), a device operating according to the MICROSOFT™ Pocket PC specification with the MICROSOFT™ Windows CE operating system (OS), a device running the Symbian OS, a device running the Andriod OS, a device running the PALM™ OS, a mobile phone, a device running the iPhone OS, a BLACKBERRY™ device, a smart phone, a hand held computer, a palmtop computer, a tablet computer, a laptop computer, and an ultra-mobile PC.

Besides the above-described techniques that employ a BlazeDS message service 120, the message JMX MBeans 140 can interact with notifications 135 and send messages 115 to UI components within client application 110 using other data services. For example, alternative embodiments of the invention can use the ADOBE™ LiveCycle™ Data Service (LCDS), the open source Granite Data Services (GraniteDS), or WebORB. These alternatives to the BlazeDS-based embodiments are briefly discussed below.

LCDS represents a superset of BlazeDS functionality resident on BlazeDS message service 120. LCDS provides the same remoting and messaging capabilities as BlazeDS. LCDS also includes the Java to ADOBE™ integration needed for JMX MBeans 140 to relay messages 115 to an ADOBE™ FLEX™ client application 110. Thus, LCDS is a full-featured framework for developing enterprise RIA solutions and can be used in place of BlazeDS message service 120.

GraniteDS supports data push feature based on a producer/consumer architecture and is an open source alternative to LCDS. GraniteDS is integrated with Java Platform, Enterprise Edition (J2EE) technologies, including J2EE persistence systems. As GraniteDS includes some of the functionality of LCDS and BlazeDS, so the above-described embodiments can be implemented with GraniteDS instead of the BlazeDS message service 120.

WebORB messaging includes a subsystem for exchanging messages 115 between ADOBE™ FLEX™ client application 110 and a Java application. WebORB supports four modes of integration: client-to-client, client-to-server, server-to-client, and server-to-server. WebORB supports ADOBE™ Flash applications and ADOBE™ FLEX™ clients. Like BlazeDS, WebORB provides remoting services, data management, and real-time messaging for exchanging messages 115 with ADOBE™ FLEX™ client application 110. As the WebORB architecture is similar to BlazeDS, the above-described embodiments of the invention can be adapted to use WebORB instead of the BlazeDS message service 120.

Message Adapter Embodiment

The code that is contained in APPENDIX I is an example embodiment for a JMX message adapter 150. In this embodiment, the Java programming language is used to implement message adapters. As would be appreciated by one of skill in the relevant arts, other programming languages and technologies can be used to implement JMX message adapters 150 in the programming language code sample provided in APPENDIX I.

Resource Monitoring Architecture

An exemplary JMX architecture 200 is illustrated in FIGS. 2A and 2B. FIGS. 2A and 2B are described with continued reference to the embodiments illustrated in FIG. 1. However, FIGS. 2A and 2B are not limited to those embodiments.

As shown in FIGS. 2A and 2B, JMX architecture 200 includes client application 110 and JMX server 202. JMX server 202 includes several subcomponents, which are described below with reference to FIGS. 2A and 2B.

According to the embodiment depicted in FIG. 2A, JMX architecture 200 includes three layers. These are: distributed layer 235, agent layer 245, and instrumentation layer 285. In the exemplary embodiment shown in FIG. 2A, instrumentation layer 285 resides on an MBean server.

FIG. 2A illustrates how these layers work together within JMX architecture 200. Distributed layer 235 is the outermost layer and is responsible for exposing JMX agents to resource management applications, such as, but not limited to, client application 110. In an embodiment, JMX agents are Java processes that provide a set of services for JMX MBeans 140. In the embodiment of the JMX architecture 200 provided in FIG. 2A, JMX agents include timer service 255, monitoring service 265, and relationship service 275. According to an embodiment, in order to make JMX agents available, distributed layer 235 uses protocol adapter 225 or protocol connector 215.

Distributed layer 235 makes JMX MBeans 140 visible via protocols, such as, but not limited to, Hypertext Transfer Protocol (HTTP) or Simple Network Management Protocol (SNMP), and it uses calls 125 to protocol connector 215 to expose the agents' application programming interfaces (APIs) to other distributed technologies such as the Java Remote Method Invocation (RMI) API. For example, an agent within agent layer 245 may provide an RMI connection for a client application 110 running in a location remote from JMX server 202 or another application running in a remote location.

Agent layer 245 contains the adapters and connectors needed to initiate calls 125 to distributed layer 235. According to an embodiment, agent layer 245 can use JMX agents to contain a JMX MBean 140. Alternatively, a developer can write a new agent to contain a JMX MBean 140. JMX agents such as timer service 255 and monitoring service 265 provide MBean services including timing and monitoring of managed resources 295, respectively, by dynamically loading JMX MBeans 140 onto JMX server 202, and defining relationships between managed resources 295.

According to an embodiment of the invention, agent layer 245 is a Java process running on a server machine where one or more managed resources 295 reside. Agent layer 245 provides a container for agent plug-ins to run in, services for runtime support of the agent plug-ins, and communication protocols 125 for interaction with the agent services and plug-ins via protocol connector 215 in distributed layer 235.

Agent layer 245 further comprises an MBean server within instrumentation layer 285 comprising a message JMX MBean 140 corresponding to each managed resource 295 being monitored by JMX server 202.

In accordance with an embodiment, agent layer 245 also contains the runtime environment, or the MBean server within agent layer 245. According to an embodiment, JMX MBeans 140 must register their presence with the MBean server so that the management framework of agent layer 245 can detect them. The MBean server also handles management messages that are sent among registered JMX MBeans 140.

Instrumentation layer 285 contains JMX MBeans 140 and their managed resources 295. From this layer, a JMX MBean 140 can be used to encapsulate a managed resource 295 and expose the managed resource 295 for management and monitoring via client application 110. As an exemplary embodiment of how managed resources 295 in instrumentation layer 285 function, a client application 110 that uses a JMX MBean 140 to direct an enterprise application (i.e., a managed resource 295) to look up business information from a database table. According to this embodiment, the JMX MBean 140 corresponding to the enterprise application receives this information and passes it to client application 110. As shown in FIG. 2A, the information is passed to client application 110 via calls 125 from agent layer 245 to distributed layer 235 which cause messages 115 to be relayed to client application 110.

In an embodiment, a Control Center application extends JMX to provide additional protocol support and services using a SYBASE™ Control Center management agent or server. An exemplary SCC Management Agent/Server is illustrated in FIG. 2B within the context of JMX architecture 200.

FIG. 2B is described with continued reference to the embodiments illustrated in FIGS. 1 and 2A. However, FIG. 2B is not limited to those embodiments.

FIG. 2B depicts an embodiment of invention used with a SYBASE™ Control Center (SCC) application although the embodiment of FIG. 2B is applicable to other applications of similar functionality and/or purpose. FIG. 2B illustrates how JMX architecture 200 can be extended in order to provide additional protocol support and services and plug-ins used by SCC.

In the exemplary embodiment of FIG. 2B, managed resources 295 include a SYBASE™ ADAPTIVE SERVER™ Enterprise (ASE) database server, a SYBASE™ IQ analytics server, and a replication server. As will be appreciated by persons skilled in the relevant art(s), other managed resources 295 could be managed by client application 110. For example, other enterprise database servers could be managed resources 295.

As shown in FIG. 2B, according to one embodiment of the invention, client application 110 can be an SCC web application running on a mobile device or a Command Line Interface (CLI).

According to an embodiment, agent layer 245 comprises a plurality of JMX services 290 that communicate with protocol connector 215 in distributed layer 235 via calls 125. As discussed above with reference to FIG. 2A, JMX services 290 can include timer service 255, monitoring service 265, and relationship service 275.

In the embodiment depicted in FIG. 2B, agent layer 245 further comprises SCC management agent/server value added services 280. Value added services 280 can include, but are not limited to, security services, session services, file transfer services, remote shell services, discovery services, and messaging services.

According to an embodiment of the present invention, UA framework provides a plurality of services, which can be leveraged by agent plug-ins in agent layer 245 on JMX server 202. In one embodiment, some of the plurality of services are mandatory, and others are optional. The optional services may be disabled to conserve memory and CPU capacity of a JMX server 202 or a server hosting client application 110. In accordance with this exemplary embodiment, the mandatory services include bootstrap, agent, session, environment, configuration, and security services. The optional services may include one or more of discovery, file transfer, plug-in registration, Java Remote Method Invocation (RMI), remote shell, messaging, alert management, Tabular Data Stream (TDS), Simple Network Management Protocol (SNMP), SYBASE™ Control Center (SCC), and other services.

Agent layer 245 includes an MBean server having instrumentation layer 285. In the embodiment provided in FIG. 2B, there are JMX MBeans 140 corresponding to each of the managed resources 295. For example, ASEAgent JMX MBean 140 communicates messages 135 between the ADAPTIVE SERVER™ and instrumentation layer 285. Similarly, an IQAgent JMX MBean communicates messages 135 between the managed SYBASE™ IQ server and instrumentation layer 285 and RSAgent JMX MBean communicates messages between the replication server and instrumentation layer 285. In this way, the respective JMX MBeans 140 for each managed resource 295 receive information via messages 135 and are able to pass this information to SCC client applications 110.

As described above with reference to FIG. 2A, information received in messages 135 from JMX MBeans 140 is passed via calls 125 between agent layer 245 and distributed layer 235. Distributed layer 235 communicates with client application by sending messages 115 via protocol connector 215. Distributed layer 235 also includes specialized protocol adapters 270. In an embodiment of the present invention, specialized protocol adapters 270 include adapters for Java RMI, HyperText Markup Language (HTTP), and Simple Object Access Protocol (SOAP). Distributed layer 235 also includes discovery services 260. According to an embodiment of the invention, discovery services 260 include services for the Jini network architecture, User Datagram Protocol (UDP), and Lightweight Directory Access Protocol (LDAP). Discovery services 260 and specialized protocol adapters 270 are configured to send messages 115 to SCC web client application 110.

Figure 3:
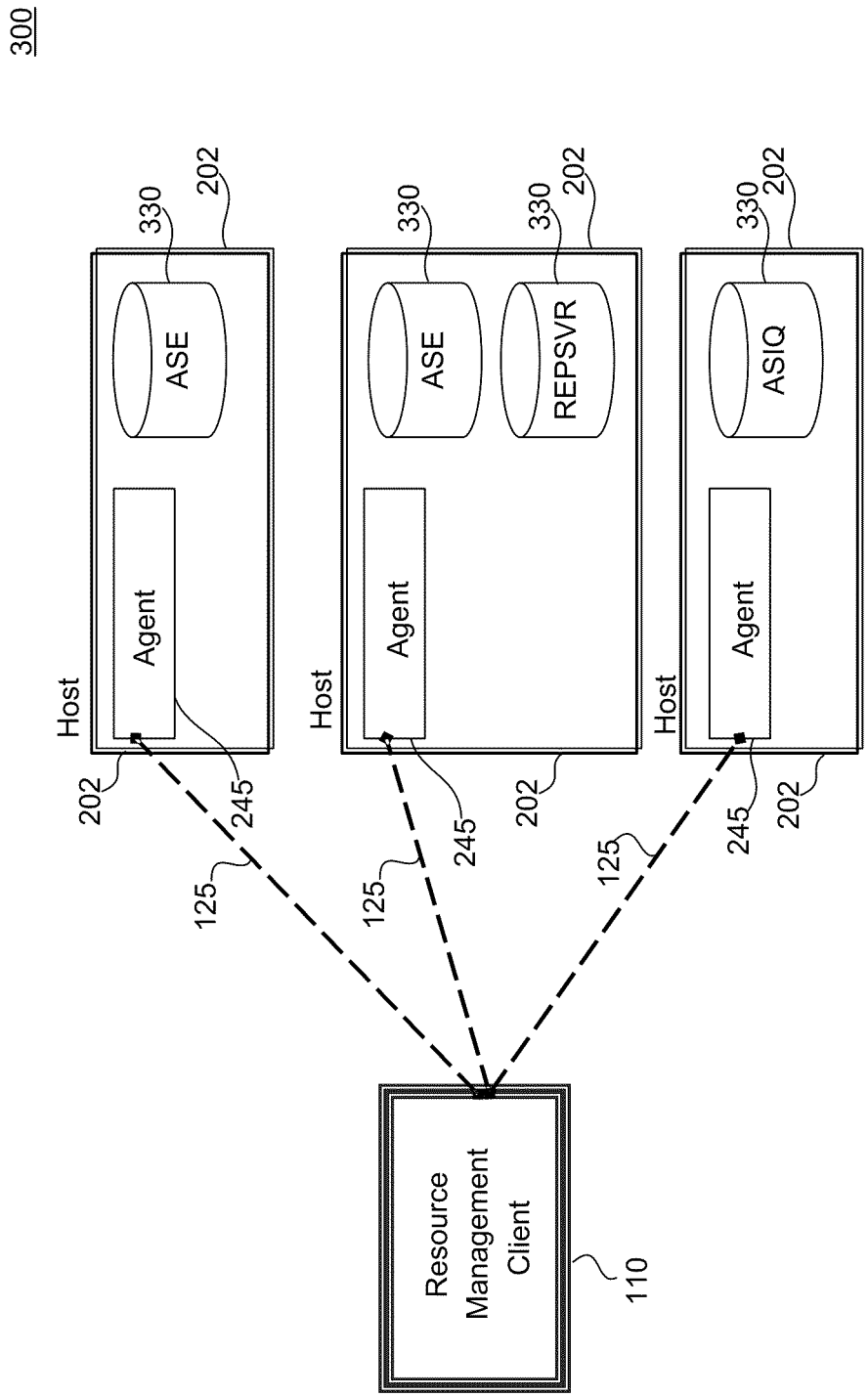
FIG. 3 depicts a modular view of a system for deploying management agents to servers and hosts, in accordance with an embodiment of the present invention.

FIG. 3 illustrates a modular view of a system 300 for deploying management agents to servers and hosts. FIG. 3 is described with continued reference to the embodiments illustrated in FIGS. 1, 2A, and 2B. However, FIG. 3 is not limited to those embodiments.

According to an embodiment of the invention, a management agent may be placed (deployed) on each host JMX server 202 within system 300. In an embodiment, a networked client application 110 communicates, via calls 125, with managed objects 330 representing managed resources 295 that are available for management. According to an embodiment of the invention, client application 110 deploys a management agent to the agent layer 245 of each JMX server 202 hosting a managed object 330 being monitored at client application 110. This deployment occurs during the creation of a UI component in client application 110 associated with managed objects 330 hosted on JMX servers 202.

In an alternative embodiment of the invention, "agentless" monitoring can be performed in system 300. For example, a JMX server 202 without an agent layer 245 (not shown) communicates directly with an ASE server 330 or replication server 330. According to this embodiment of the invention an 'agentless' architecture, the agent resides in a central location and can communicate with managed resource 295. For example, an agent hosted on a central server can communicate with managed resources via JDBC calls or calls to other APIs.

As shown in the exemplary embodiment of FIG. 3, the hosts are JMX servers 202, which each have an agent layer 245. An agent layer 245 on each JMX server 202 is configured to communicate with resource management client application 110 in order to receive, via calls 125 from agent layer 245, information regarding management agents being deployed within system 300. As described above with reference to FIGS. 2A and 2B, messages 115 are communicated directly between resource management client application 110 and a distributed layer 235 within each host/JMX server 202 hosting a managed object 330 representing a managed resource 295 within system 300. For clarity, messages 115, distributed layers 235, and managed resources 295 are not depicted in FIG. 3.

In accordance with an embodiment of the invention hosts/JMX servers 202 comprise managed objects 330 representing different managed resources 295 residing on the hosts/JMX servers 202. Managed objects 330 are logical representations of their corresponding managed resources 295. According to an embodiment, each managed resource 295 is represented as one managed object 330 that in turn has a JMX notification broadcaster JMX MBean 140 associated with it on its host/JMX server 202.

In the exemplary embodiment depicted in FIG. 3, managed objects 330 are logical representations of SYBASE™ ADAPTIVE SERVER™ Enterprise (ASE) servers, a replication server, and a SYBASE™ ADAPTIVE SERVER™ IQ (ASIQ) server. In an embodiment, a managed object 330 is instantiated on JMX server 202 for a replication server having database replication software that moves and synchronizes data across an enterprise. For example, the database replication server can perform bi-directional replication across the two ASE database servers depicted in FIG. 3, which can be in multiple geographical locations. Database replication software running on the replication server represented as managed object 330 comprises instructions to achieve a host of enterprise application needs, including guaranteed data delivery, real-time business intelligence, and zero operational downtime for the ASE databases residing on a plurality of hosts.

Manages Resource Registration Method

Figure 4:
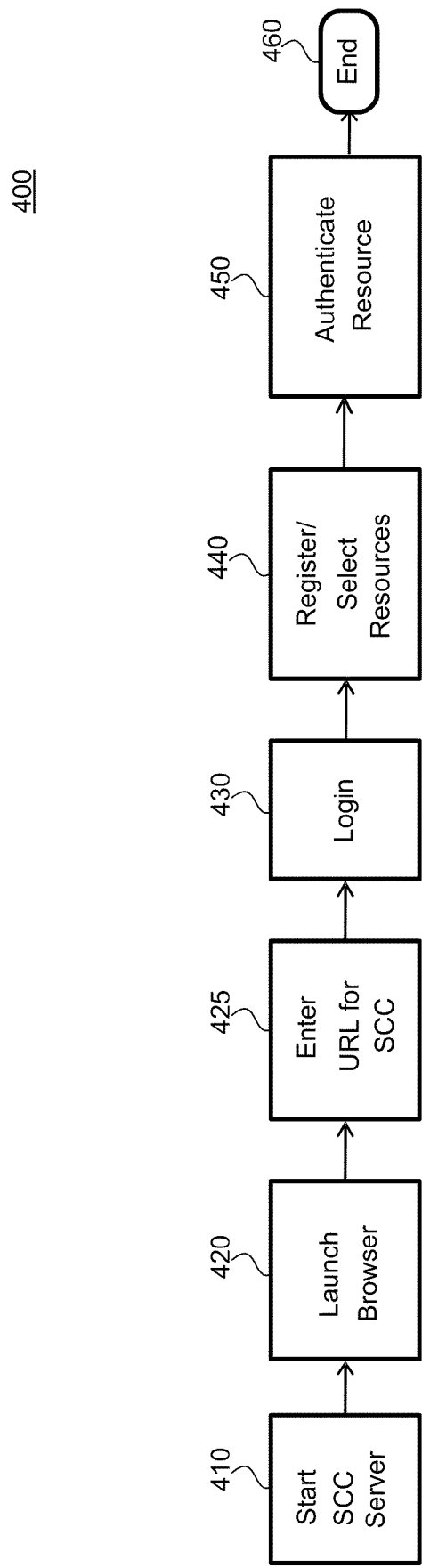
FIG. 4 is a flowchart illustrating steps by which resource registration and authentication is performed, in accordance with an embodiment of the present invention.

FIG. 4 is a flowchart 400 illustrating steps by which resource registration and authentication is performed, in accordance with an embodiment of the present invention.

More particularly, flowchart 400 illustrates the steps by which a managed resource is registered in client application 110 and by which a user is authenticated to monitor the managed resource, according to an embodiment of the present invention.

FIG. 4 is described with continued reference to the embodiments illustrated in FIGS. 1-3. However, FIG. 4 is not limited to those embodiments. Note that the steps in the flowchart do not necessarily have to occur in the order shown.

Figure 5:
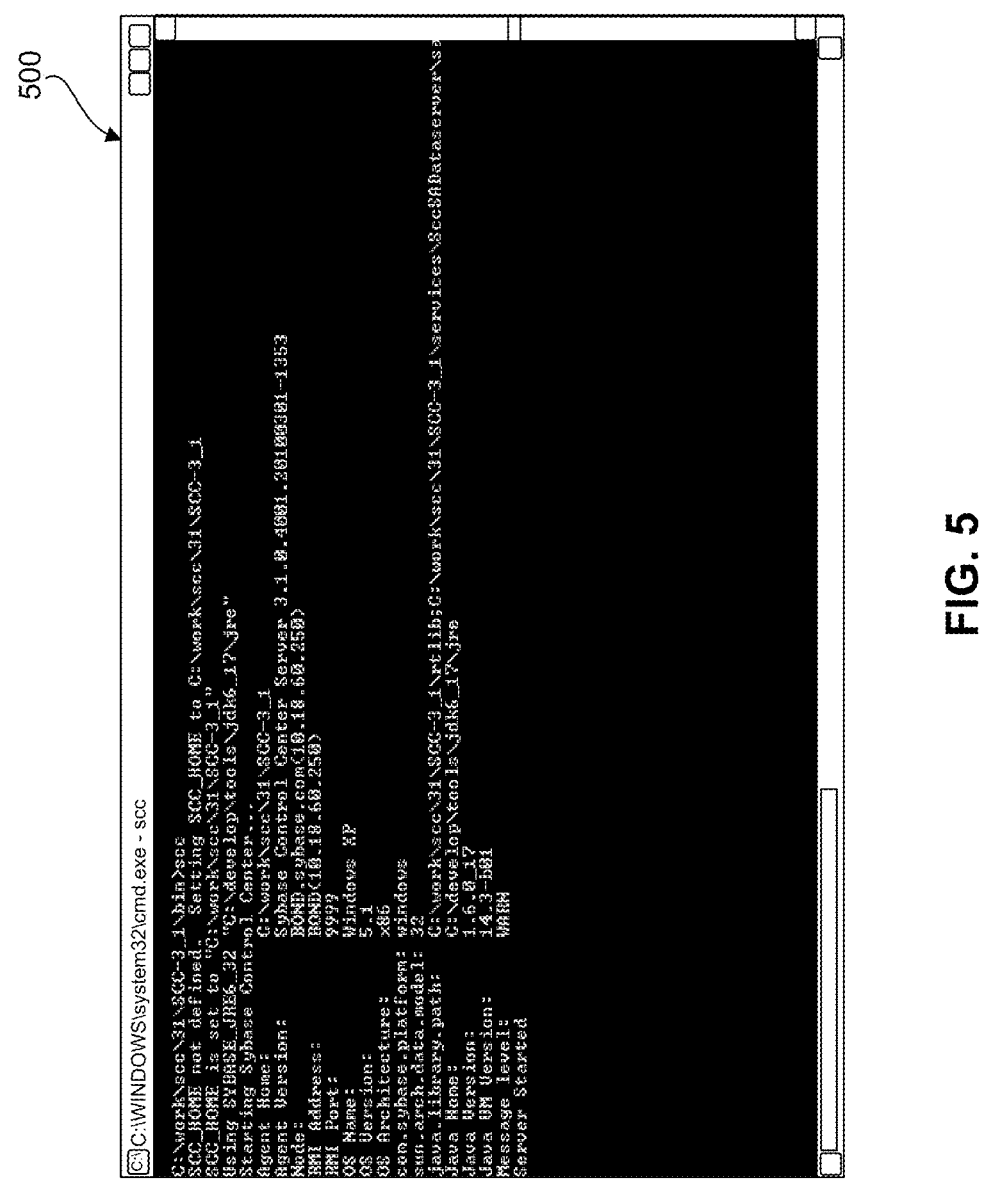

The method begins at step 410 when a JMX server 202 is started. In the exemplary embodiment illustrated in FIG. 4, JMX server 202 is an SCC server. FIG. 5 provides an example display 500 depicting the status of the startup of the SCC server started in step 410.

After the SCC server is started, the method proceeds to step 420.

In step 420, a web browser is launched within a user interface of client application 110. In embodiments of the invention, the web browser launched in this step can be a commercially available or open source Internet web browser, including, but not limited to, MICROSOFT™ Internet Explorer, Mozilla Firefox, GOOGLE™ Chrome, APPLE Safari, and OPERA™. After the web browser is launched, the method proceeds to step 425.

Figure 6:
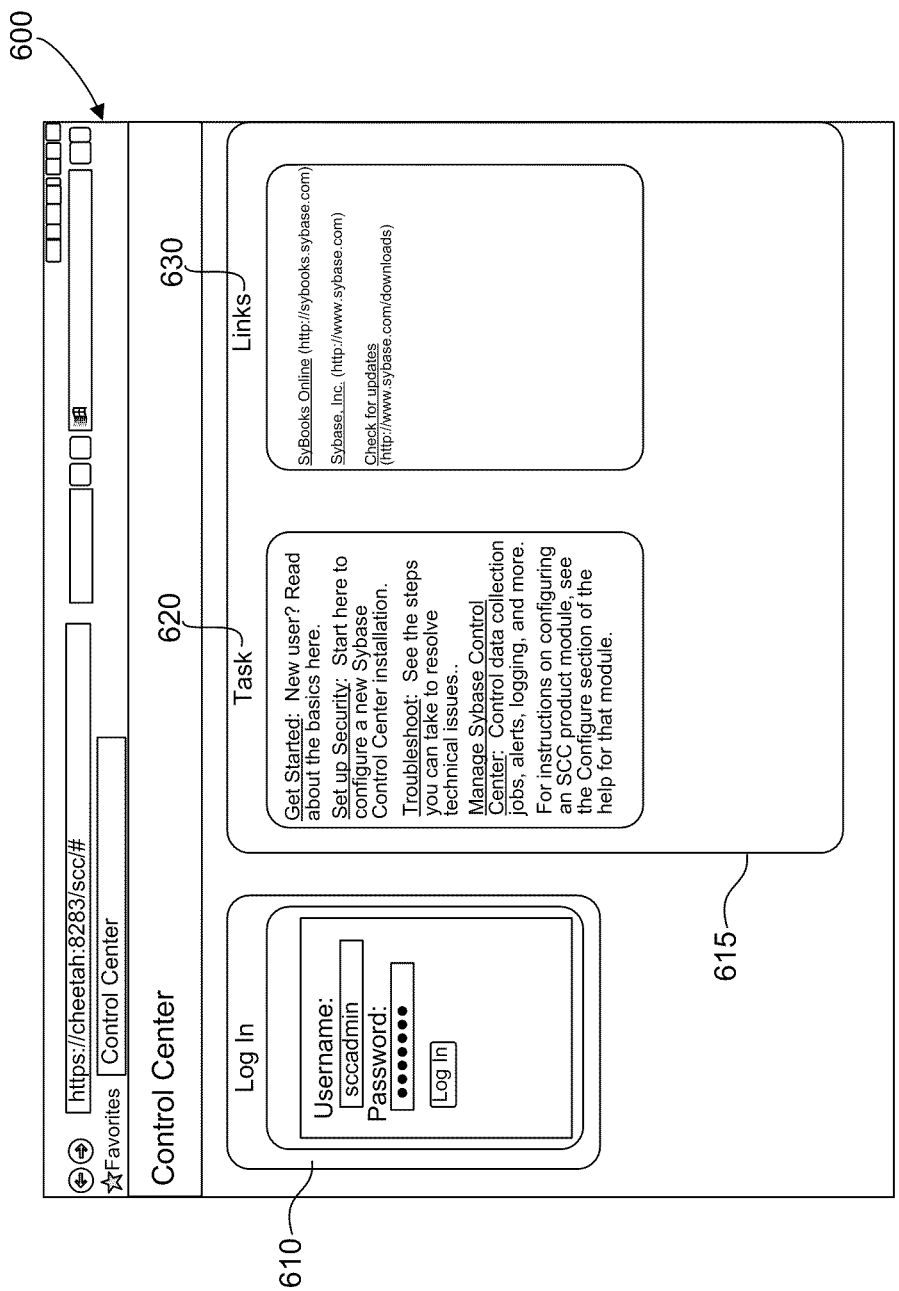
FIGS. 6-9 illustrate an exemplary graphical user interface (GUI) wherein resources are registered and authenticated, in accordance with an embodiment of the invention.

In step 425, a Uniform Resource Locator (URL) for an SCC application is received when the URL is entered within the browser session initiated in step 420. FIG. 6 provides an example interface 600 depicting a web browser interface on a client application 110 after an SCC URL (e.g., "https://cheetah:8283/scc") has been received. After the URL for an SCC application is received, the method proceeds to step 430.

In step 430, a user is logged into the SCC server. In this step, credentials for a login to the SCC server are received. Interface 600 depicts an example login dialog interface 610 wherein a user name and password can be entered. After the login credentials are received and the login is completed, the method proceeds to step 440.

Figure 7:
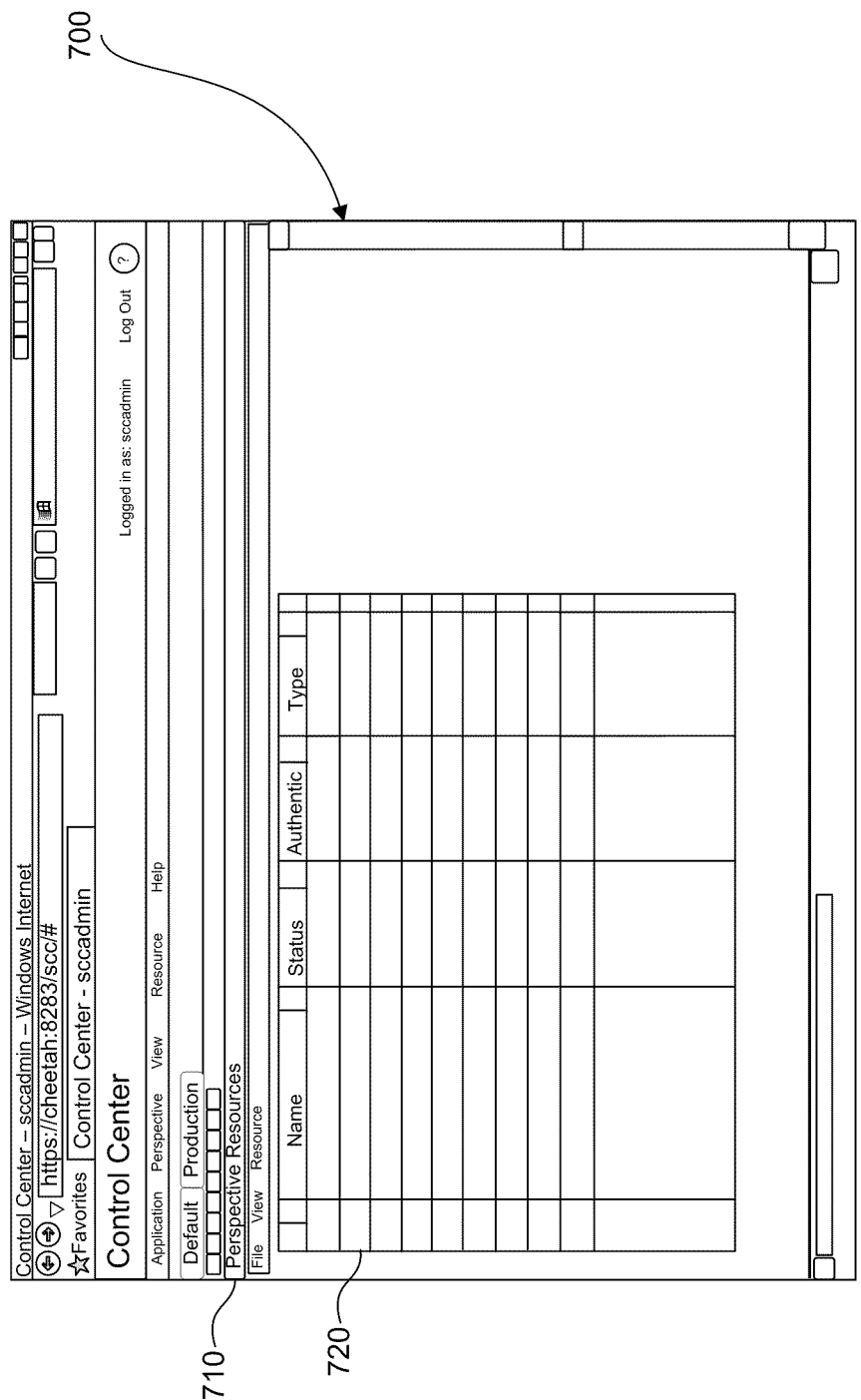
Figure 8:
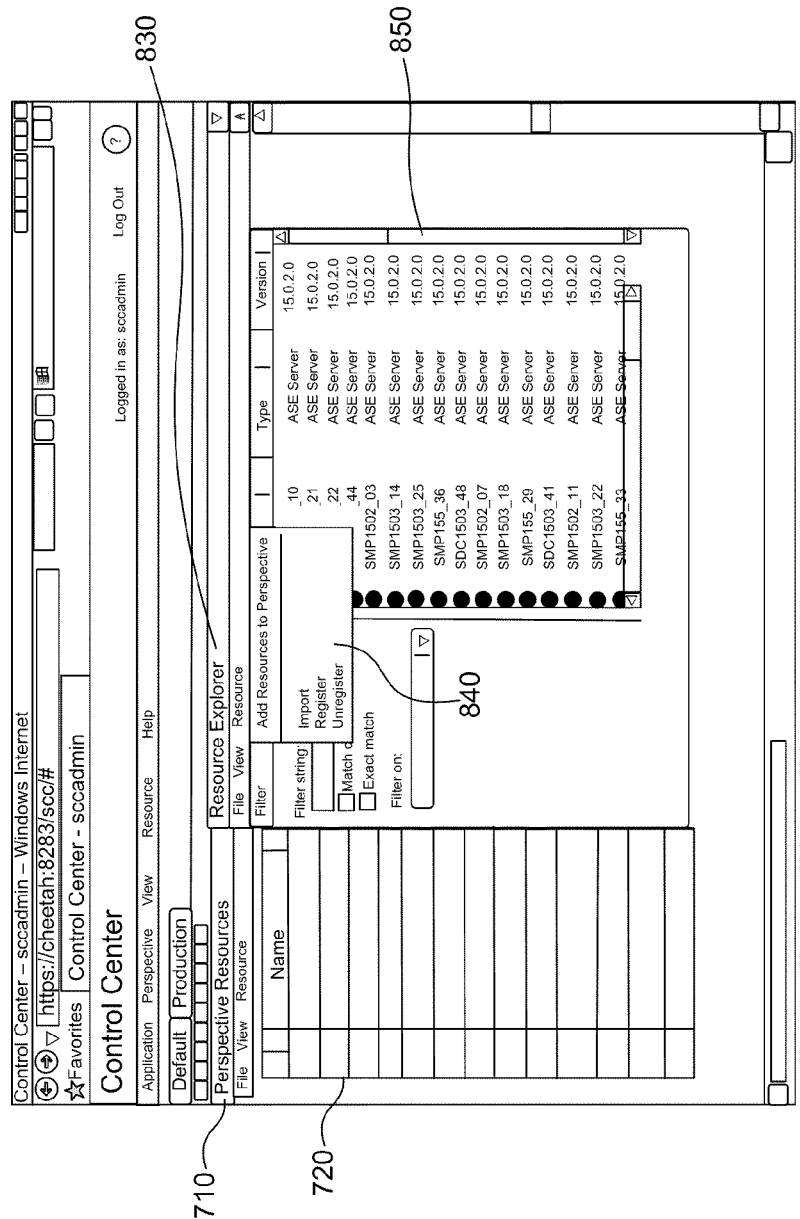

In step 440, managed resources 295 are selected and registered. FIGS. 7 and 8 depict an example interface 700 for selecting and registering one or more managed resources 295. After managed resources 295 are selected and registered, the method proceeds to step 450.

Figure 9:
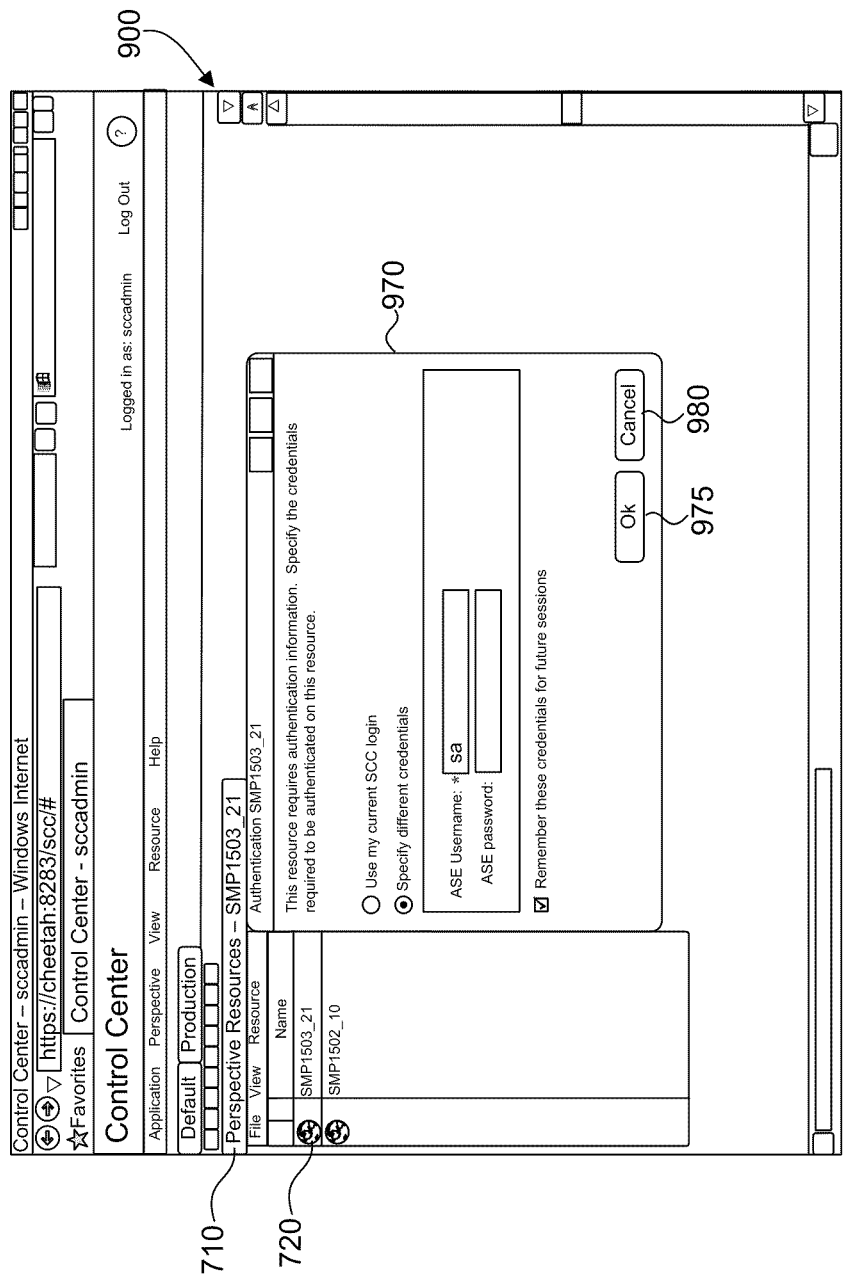
Figure 10:
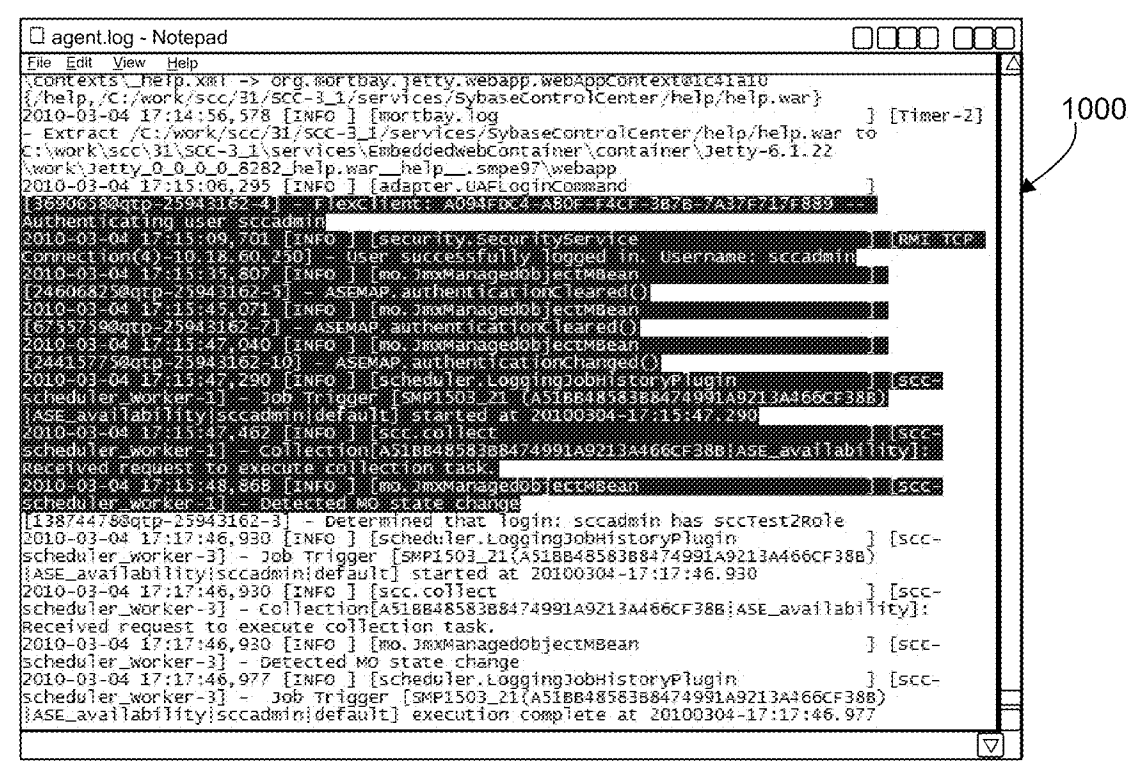

In step 450, the managed resources 295 selected and registered in step 440 are authenticated. FIG. 9 depicts an example interface 900 with an authentication dialog interface 970 where authentication credentials can be entered. As shown in FIG. 9, a user can authenticate to a managed resource 295 using the user login credentials received in step 430. Alternatively, a user can authenticate to a managed resource 295 using different credential received within authentication dialog interface 970. FIG. 10 depicts a display 1000 displaying an authentication log showing the results of authenticating to a managed resource 295. As shown in interface 1000, when a user is successfully authenticated to a managed resource 295 in step 450, the state of a corresponding managed object 330 is available from a JMX MBean 140 ("mo.JmxManagedObjectMBean"). After the managed resources 295 are authenticated, the method proceeds to step 460 and the method ends.

Example Graphical User Interface

FIGS. 6-9 and 11-12 illustrate a graphical user interface (GUI), according to an embodiment of the present invention. The GUI depicted in FIGS. 6-9 and 11-12 is described with reference to the embodiments of FIGS. 1-4. However, the GUI is not limited to those example embodiments, and the embodiments of FIGS. 1-4 are not limited to the example GUI of FIGS. 6-9 and 11-12. For example, the GUI interface may be used for selecting and registering managed resources 295, as described in steps 410-460 above with reference to FIG. 4. The GUI may also be used to monitor managed resources 295 within the systems 100 and 300 and JMX architecture 200 with reference to FIGS. 1-3. In an embodiment of the invention, the GUI illustrated in FIGS. 6-9 and 11-12 is displayed within a web browser session running on a client application 110.

Although in the exemplary embodiments depicted in FIGS. 6-9 and 11-12 the GUI is shown as using an SCC application, it is understood that the GUI can be readily adapted to monitor managed resources 295 using other resource management platforms.

Throughout FIGS. 6-9 and 11-12, displays are shown with various icons, command regions, dialog interfaces, buttons, menus, links, and data entry fields, which are used to initiate action, invoke routines, launch displays, enter data, view data, or invoke other functionality. The initiated actions include, but are not limited to logging in to an SCC application, selecting SCC tasks, displaying managed resources 295, selecting managed resources 295, registering managed resources 295, and authenticating to managed resources 295. For brevity, only the differences occurring within the figures, as compared to previous or subsequent ones of the figures, are described below.

FIG. 6 illustrates an exemplary login interface 600 for logging into an SCC application. Login interface 600 includes login dialog interface 610 wherein credentials such as a user name and password can be received via an input device (not shown). Once login credentials are received in login dialog interface 610, the corresponding user is authenticated (logged in) to an SCC application. Login interface 600 also includes task dialog interface 615. Task dialog interface 615 includes task window 620 and links window 630. By receiving, via an input device (not shown), selection of one or more tasks by an authenticated user within task window 620, tasks associated with resource monitoring are initiated. In the exemplary embodiment illustrated in FIG. 6, tasks for setting up security, troubleshooting, and managing the SCC application can be selected within tasks window 620. In an embodiment of the invention, tasks related to managing the SCC application include, but are not limited to, controlling data collection from managed resources 295, managing event-triggered alerts from managed resources 295, and logging operations. By receiving, via an input device (not shown), a user can navigate to one or more links within links window 630. In the exemplary embodiment shown in FIG. 6, links to documentation for the SCC application can be selected, as can links to updates to the SCC application.

FIGS. 7 and 8 illustrate an exemplary managed resource selection interface 700 for selecting, importing, registering, or unregistering one or more managed resources 295. By receiving, via an input device (not shown), selection of one or more managed resources 295 associated with perspective resources 710, managed resource selection interface 700 will display information related to the selected managed resources 295 in managed resource status window 720. In the exemplary embodiment illustrated in FIG. 7, the name, status, and type of a selected managed resource 295 can be displayed in managed resource status window 720.

FIG. 8 illustrates a resource explorer 830 comprising a resource menu 840. By receiving, via an input device (not shown), selection of a menu item within resource menu 840, a managed resource 295 can be added to perspective resources 710. Resource menu 840 can be used to receive commands to import, register, and unregister managed resources 295. Resource window 850 within resource explorer 830 lists resource information similar to the information displayed in managed resource status window 720. Importing and registering a new managed resource 295 adds it to perspective resources 710. Conversely, unregistering a managed resource 295 removes it from perspective resources 710.

FIG. 9 illustrates an exemplary managed resource authentication interface 900 for authenticating a user to a managed resource 295. Managed resource authentication interface 900 can be used to authenticate a user to one or more managed resources 295 from perspective resources 710 listed in managed resource status window 720. Managed resource authentication interface 900 includes authentication dialog interface 970. Authentication dialog interface 970 includes a radio button to either authenticate to a managed resource 295 with of a user's current SCC login credentials or with different credentials. As illustrated in FIG. 9, if different credentials are to be used, a user name and password can be entered, using an input device (not shown) in authentication dialog interface 970. Once the login credentials have been selected or entered, OK button 975 can be selected to initiate authentication of the selected/entered credentials to the managed resource 295. Conversely, Cancel button 980 can be selected to cancel the authentication of the credentials to the managed resource 295.

Figure 11:
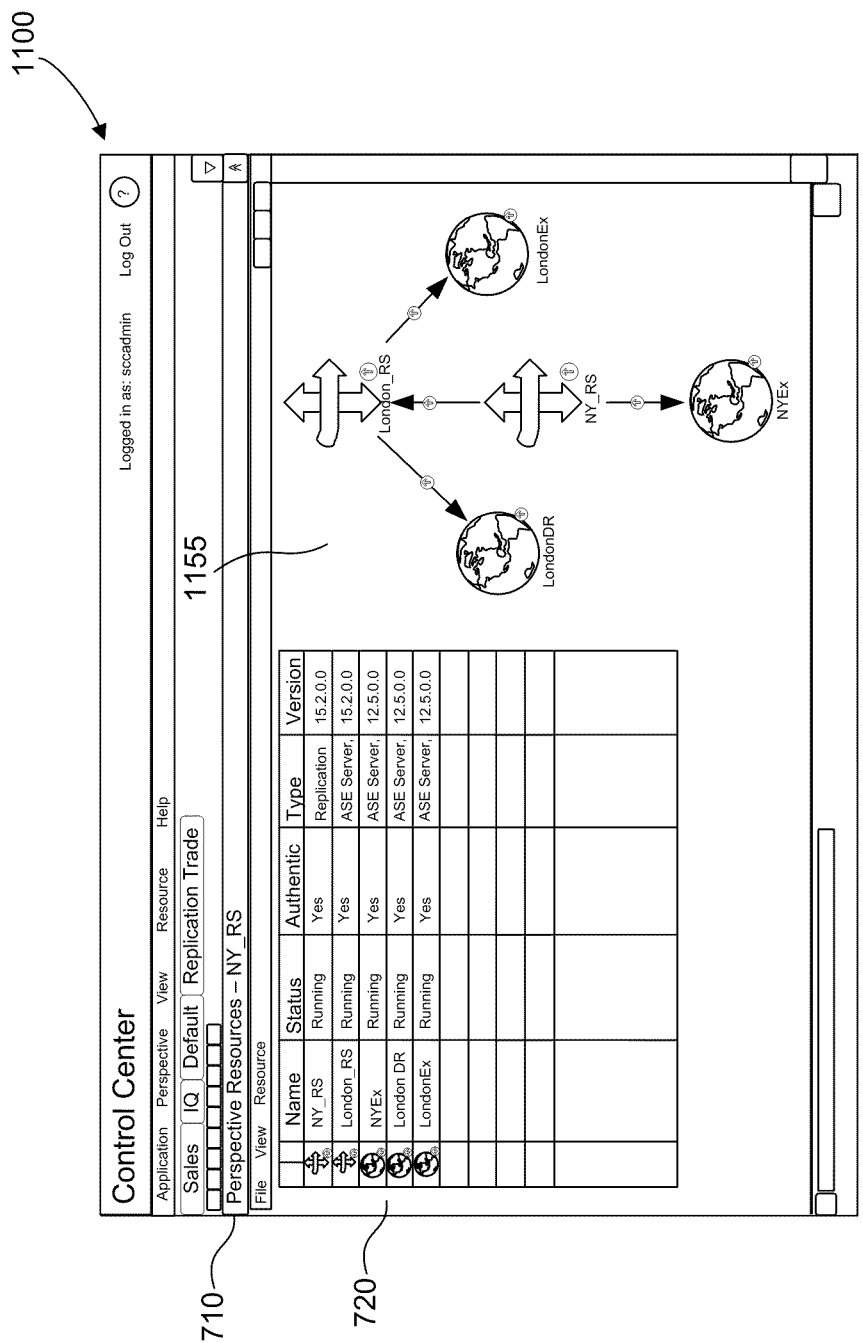
FIGS. 11 and 12 illustrate an exemplary graphical user interface (GUI) wherein resources are monitored, in accordance with an embodiment of the invention.

FIG. 11 illustrates an exemplary topology view interface 1100 for monitoring a plurality of managed resources 295. In the exemplary interface 1100 depicted in FIG. 11, perspective resources 710 listed in managed resource status window 720 are graphically depicted in topology window 1155. As shown in FIG. 11, the statuses of perspective resources 710 in multiple geographic locations (e.g., New York and London) are indicated in managed resource status window 720 and graphically depicted in topology window 1155. Topology window 1155 also depicts associations and linkages between perspective resources 710. Topology window 1155 provides a graphical display of those relationships, illustrates how the corresponding managed resources 295 are connected, and illustrates how they interact with one another. In an embodiment, topology view interface displays the health of the replication system at a glance by showing the status of links between a replication server being monitored and the managed resources 295 that the replication server replicates data to. In an embodiment, topology view interface 1100 graphically depicts the status or health of links between perspective resources 710 by displaying an up arrow on the link. Alternatively, the health of perspective resources 710 and links between them can be color coded (not shown). For example, topology view interface 1100 can depict a 'heat chart' for perspective resources 710 by indicating managed resources 295 that running normally as green, managed resources 295 that are resource constrained (i.e., low CPU or storage capacity) or otherwise triggering alerts as yellow, and managed resources 295 that are shutdown or in unknown states as red.

In an embodiment of the invention, the current status of perspective resources 710 and links between perspective resources 710 displayed in topology window 1155 is based upon messages 115 received by client application 110 from BlazeDS message service 120.

Figure 12:
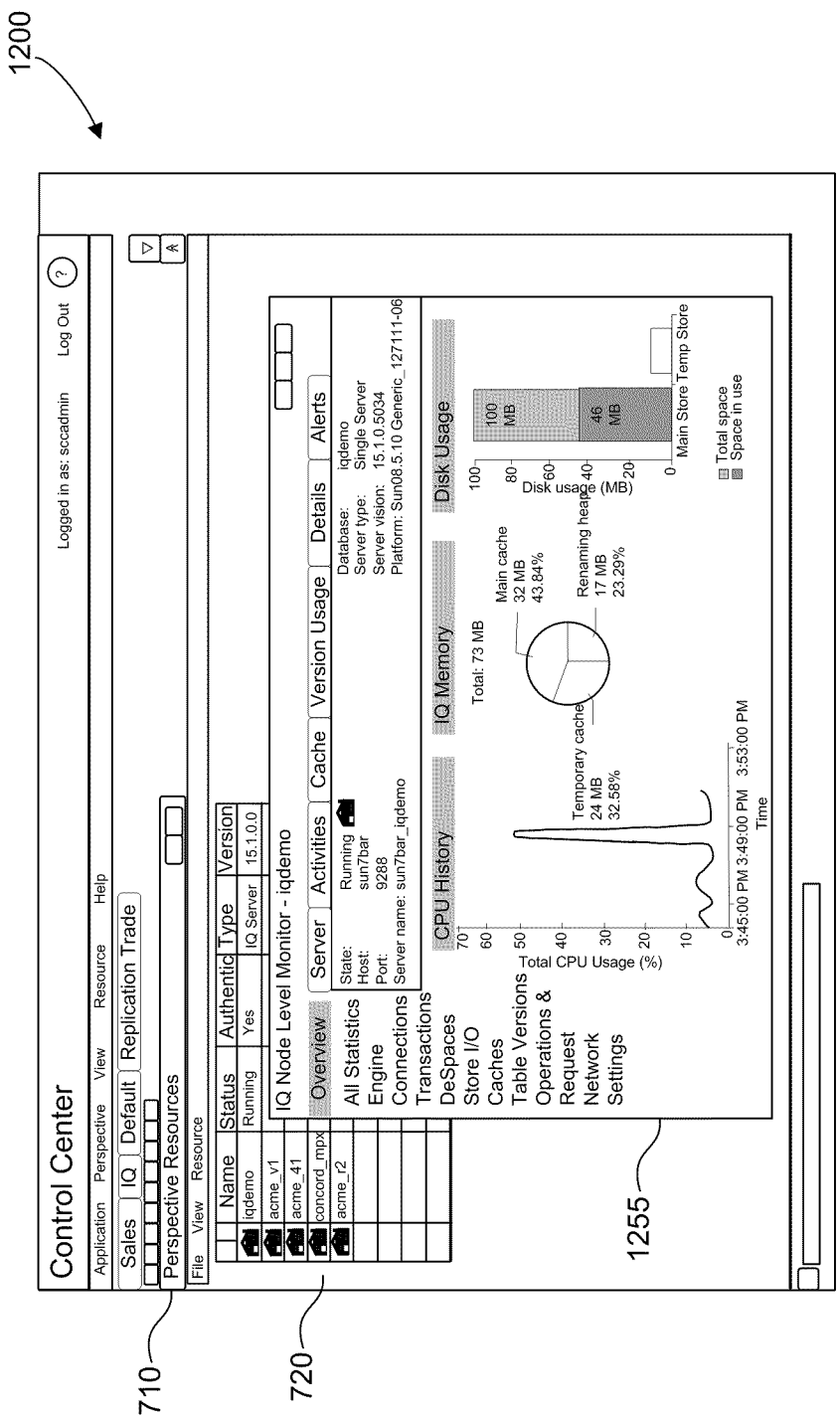

FIG. 12 illustrates an exemplary server overview interface 1200 for displaying summary information about a managed resource 295. Server overview interface 1200 displays the status of key managed resources such as historical CPU usage, available disk space, disk usage, user connections, available memory, and memory allocation in status window 1255. Status window 1255 also provides tabs that can be selected, using an input device, to display information about the usage of configurable resources, license allocation, and alerts that have been generated for a managed resource 295 selected from perspective resources 710 in managed resource status window 720. In accordance with an embodiment of the invention, the status of perspective resources 710 and links between perspective resources 710 displayed in status window 1255 is based upon messages 115 received by client application 110 from BlazeDS message service 120. A connections screen (not shown) may be selected within status window 1255 to display a list of active connections between perspective resources 710. A transaction monitoring screen (not shown) may be selected within status window 1255 to display a list of active transactions, associated connections, statements being executed, and other transaction-level information related to the perspective resources 710.

Example Computer System Implementation

Figure 13:
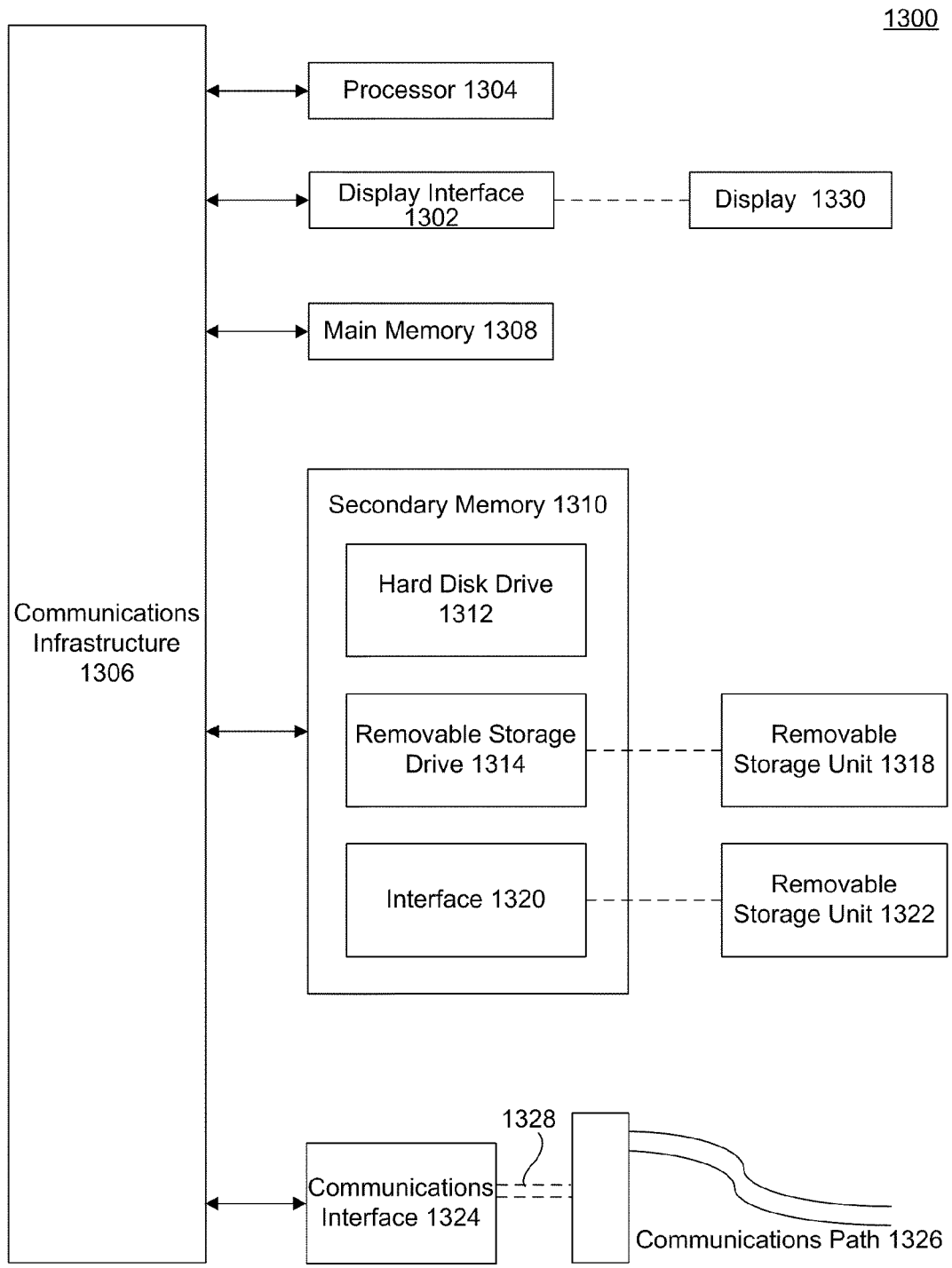
FIG. 13 depicts an example computer system in which the present invention may be implemented.

Various aspects of the present invention can be implemented by software, firmware, hardware, or a combination thereof. FIG. 13 illustrates an example computer system 1300 in which the present invention, or portions thereof, can be implemented as computer-readable code. For example, the method illustrated by the flowchart 400 of FIG. 4 can be implemented in system 1300. Resource monitoring systems 100 and 300 of FIGS. 1 and 3 can also be implemented in system 1300. Also, JMX architecture 200 of FIGS. 2A and 2B can be implemented in system 1300. Various embodiments of the invention are described in terms of this example computer system 1300. After reading this description, it will become apparent to a person skilled in the relevant art how to implement the invention using other computer systems and/or computer architectures.

Computer system 1300 includes one or more processors, such as processor 1304. Processor 1304 can be a special purpose or a general-purpose processor. Processor 1304 is connected to a communication infrastructure 1306 (for example, a bus, or network).

Computer system 1300 also includes a main memory 1308, preferably random access memory (RAM), and may also include a secondary memory 1310. Secondary memory 1310 may include, for example, a hard disk drive 1312, a removable storage drive 1314, flash memory, a memory stick, and/or any similar non-volatile storage mechanism. Removable storage drive 1314 may comprise a floppy disk drive, a magnetic tape drive, an optical disk drive, a flash memory, or the like. The removable storage drive 1314 reads from and/or writes to a removable storage unit 1318 in a well-known manner. Removable storage unit 1318 may comprise a floppy disk, magnetic tape, optical disk, etc. which is read by and written to by removable storage drive 1314. As will be appreciated by persons skilled in the relevant art(s), removable storage unit 1318 includes a computer usable storage medium having stored therein computer software and/or data.

In alternative implementations, secondary memory 1310 may include other similar means for allowing computer programs or other instructions to be loaded into computer system 1300. Such means may include, for example, a removable storage unit 1322 and an interface 1320. Examples of such means may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1300.

Computer system 1300 may also include a communications interface 1324. Communications interface 1324 allows software and data to be transferred between computer system 1300 and external devices. Communications interface 1324 may include a modem, a network interface (such as an Ethernet card), a communications port, a PCMCIA slot and card, or the like. Software and data transferred via communications interface 1324 are in the form of signals, which may be electronic, electromagnetic, optical, or other signals capable of being received by communications interface 1324. These signals are provided to communications interface 1324 via a communications path 1326. Communications path 1326 carries signals and may be implemented using wire or cable, fiber optics, a phone line, a cellular phone link, an RF link or other communications channels.

Computer system 1300 may additionally include computer display 1330. According to an embodiment, computer display 1330, in conjunction with display interface 1302, can be used to display UI 135 on operator console 130. Computer display 1330 may also be used to display the GUI interfaces depicted in FIGS. 5-8.

In this document, the terms "computer program medium" and "computer usable medium" are used to generally refer to media such as removable storage unit 1318, removable storage unit 1322, and a hard disk installed in hard disk drive 1312. Signals carried over communications path 1326 can also embody the logic described herein. Computer program medium and computer usable medium can also refer to memories, such as main memory 1308 and secondary memory 1310, which can be memory semiconductors (e.g. DRAMs, etc.). These computer program products are means for providing software to computer system 1300.

Computer programs (also called computer control logic) are stored in main memory 1308 and/or secondary memory 1310. Computer programs may also be received via communications interface 1324. Such computer programs, when executed, enable computer system 1300 to implement the present invention as discussed herein. In particular, the computer programs, when executed, enable processor 1304 to implement the processes of the present invention, such as the steps in the methods illustrated by flowchart 400 of FIG. 4 and systems 100 and 300 of FIGS. 1 and 3 discussed above. Accordingly, such computer programs represent controllers of the computer system 1300. Where the invention is implemented using software, the software may be stored in a computer program product and loaded into computer system 1300 using removable storage drive 1314, interface 1320, hard drive 1312, or communications interface 1324.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for monitoring a managed resource, comprising:
   establishing a subscription to a broadcast notification associated with the managed resource, wherein the establishing comprises:
   creating a user interface (UI) component in a client application to subscribe to a Java Management Extensions (JMX) broadcast notification associated with the managed resource;
   receiving, at the client application, during the creating, a JMX managed object name, wherein the JMX managed object name identifies a JMX message topic associated with the managed resource;
   generating, by a JMX broadcaster, a message destined for the UI component;
   creating a JMX managed bean (JMX MBean) in a JMX server, the JMX MBean representing the managed resource for the UI component;
   subscribing the JMX MBean to the JMX broadcaster, wherein the subscribing comprises receiving one or more filter values identifying the UI component; and
   configuring the UI component to be a consumer of the JMX message topic identified by the JMX managed object name, wherein the JMX message topic is associated with the JMX MBean.

2. The method of claim 1, farther comprising:
   communicating, by a message adapter, a notification to the JMX MBean; and
   relaying the message generated by the JMX broadcaster to the UI component via the JMX MBean.

3. The method of claim 1, wherein the client application is running in a flash player.

4. The method according to claim 1, wherein the JMX MBean is created on a per user basis, and wherein the one or more filter values include user credential information.

5. The method according to claim 4, wherein the user credential information comprises at least a user name and a password.

6. The method according to claim 1, wherein the JMX MBean is created on a per session basis, and wherein the one or more filter values identify a browser session.

7. The method according to claim 1, wherein the JMX MBean is created on a per server basis, and wherein the one or more filter values identify a server.

8. The method according to claim 1, wherein the JMX MBean is created on a per application basis, and wherein the one or more filter values identify at least a server and an application.

9. The method according to claim 1, wherein the JMX MBean is created based on a type of the UI component, and wherein one or more filter values include a UI component type.

10. The method according to claim 1, further comprising: creating a UI component JMX MBean to track the UI subscription to the broadcast notification.

11. The method according to claim 10, wherein the UI component JMX MBean removes the UI subscription from the JMX server after a predefined time period has passed.

12. The method according to claim 10, wherein creating the JMX MBean comprises:
receiving, by the JMX broadcaster, a call from the client application; and
creating the JMX MBean in response to the call.

13. A system for monitoring a managed resource, comprising:
a client device implemented using one or more computers having a client application comprising a user interface (UI) component configured to subscribe to a Java Management Extensions (JMX) broadcast notification associated with the managed resource, wherein the UI component is further configured to receive a JMX managed object name identifying a JMX message topic associated with the managed resource;
a central JMX broadcaster configured to generate a message destined for the UI component;
a JMX server comprising an agent layer, a distributed layer, and an instrumentation layer, wherein the JMX server is configured to create a JMX managed bean (JMX MBean), the JMX MBean representing the managed resource for the UI component;
an MBean server configured to subscribe the JMX MBean to the central JMX broadcaster, wherein the MBean server is further configured to receive one or more filter values identifying the UI component;
wherein the client application is configured to enable the UI component to be a consumer of the JMX message topic identified by the JMX managed object name, wherein the JMX message topic is associated with the JMX MBean; and
a message adapter configured to communicate a notification to the JMX MBean, wherein the message adapter is further configured to relay the message generated by the central JMX broadcaster to the UI component via the JMX MBean.

14. The system of claim 13, wherein the client application comprises a plurality of UI components.

15. The system of claim 13, wherein the JMX server is configured to create a plurality of JMX MBeans, wherein each of the plurality of JMX MBeans corresponds to one of a plurality of managed resources.

16. The system of claim 15, wherein the plurality of managed resources comprise one or more servers, processes, and applications.

17. The system of claim 15, wherein the client application is configured to enable the UI component to be a consumer of a plurality of message topics identified by a plurality of JMX managed object names associated with respective ones of the plurality of managed resources.

18. The system of claim 15, wherein the client application is running in a flash player on a mobile device.

19. The system of claim 13, wherein the instrumentation layer of the JMX server comprises a protocol connector and a protocol adapter and the agent layer of the JMX server comprises JMX services.

20. A computer program product comprising a non-transitory computer readable storage medium having computer program logic stored thereon for enabling a processor to establish a subscription to a broadcast notification associated with a managed resource, the computer program logic comprising:
program logic configured to enable a processor to create a user interface (UI) component in a client application to subscribe to a Java Management Extensions (JMX) broadcast notification associated with the managed resource;
program logic configured to enable a processor to receive, at the client application, in response to determining that the UI component has been created, a JMX managed object name wherein the JMX managed object name identifies a JMX message topic associated with the managed resource;
program logic configured to enable a processor to generate, by a central JMX broadcaster, a message destined for the UI component;
program logic configured to enable a processor to create a JMX managed bean (JMX MBean) in a JMX server, the JMX MBean representing the managed resource for the UI component;
program logic configured to enable a processor to subscribe the JMX MBean to the central JMX broadcaster, wherein the subscribing comprises receiving one or more filter values identifying the UI component;
program logic configured to enable a processor to configure the UI component to be a consumer of the JMX message topic identified by the JMX managed object name, wherein the JMX message topic is associated with the JMX MBean;
program logic configured to enable a processor to communicate, using a message adapter, a notification to the JMX MBean; and
program logic configured to enable a processor to relay the message generated by the central JMX broadcaster to the UI component via the JMX MBean.

21. The computer program product of claim 20, wherein the client application is running in a flash player within a web browser session.

22. The computer program product of claim 20, further comprising program logic configured to deploy a management agent from the client application to an agent layer of the JMX server, wherein the management agent is associated with the JMX managed object name.

23. The computer program product of claim 20, further comprising program logic configured to enable a processor to select and register one or more managed resources to be monitored by the client application.

24. The computer program product of claim 23, further comprising program logic configured to enable a processor to authenticate user credentials to determine if a user associated with the user credentials has permissions to monitor the selected one or more managed resources.

* * * * *